United States Patent
Kitabayashi

(10) Patent No.: US 7,118,222 B2
(45) Date of Patent: Oct. 10, 2006

(54) OPTICAL DEVICE AND PROTECTOR

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 225 days.

(21) Appl. No.: 10/834,135

(22) Filed: Apr. 29, 2004

(65) Prior Publication Data
US 2005/0001985 A1 Jan. 6, 2005

(30) Foreign Application Priority Data
May 12, 2003 (JP) .............................. 2003-132941

(51) Int. Cl.
*G03B 21/14* (2006.01)
*G03B 21/16* (2006.01)
*G02F 1/1333* (2006.01)

(52) U.S. Cl. ............................ 353/52; 353/119; 349/58

(58) Field of Classification Search .................. 353/52, 353/31, 20, 119; 349/58, 161
See application file for complete search history.

(56) References Cited

U.S. PATENT DOCUMENTS 6,844,993 B1 * 1/2005 Fujimori et al. ............... 353/52
6,906,840 B1 * 6/2005 Fujimori et al. ............... 349/58

FOREIGN PATENT DOCUMENTS

| JP | A 2000-221588 | 8/2000 |
|----|---------------|--------|
| JP | A 2001-132694 | 5/2001 |
| JP | A 2002-072162 | 3/2002 |
| JP | A 2003-121931 | 4/2003 |
| JP | A 2003-121937 | 4/2003 |

* cited by examiner

*Primary Examiner*—Christopher Mahoney
(74) *Attorney, Agent, or Firm*—Oliff & Berridge, PLC

(57) ABSTRACT

An optical device (24) includes: three optical modulators (24A) for modulating respective color lights in accordance with image information; a cross dichroic prism (244) for combining the respective color lights modulated by the optical modulators (24A); a base (247) made of heat-conductive material and fixed to upper and lower faces of the cross dichroic prism (244); an irradiation-side polarization plate (243) having polarization films (243A2 and 243B2) as optical conversion films for converting an optical property of a light beam irradiated by the optical modulators (24A) and substrates (243A1 and 243B1) made of heat-conductive material and provided with the polarization films (243A2 and 243B2) attached thereto; and an irradiation-side retaining plate (246) made of heat-conductive material for supporting and fixing the irradiation-side polarization plate (243). The irradiation-side retaining plate (246) is fixed to a lateral face of the base (247).

11 Claims, 15 Drawing Sheets

OPTICAL DEVICE AND PROTECTOR

BACKGROUND OF THE INVENTION

1. Field of the Invention

The present invention relates to an optical device and a projector.

2. Description of Related Art

There has been known a three-plate projector having a color-separating optical system that separates a light beam irradiated by a light source into three color lights, three optical modulators that modulate the respective color lights in accordance with image information, a cross dichroic prism that combines the light beams modulated by the respective optical modulators (refer to, for example, Patent Document 1: Japanese Patent Laid-Open Publication No. 2000-221588, FIG. 5).

A polarization plate (optical conversion plate) that transmits only a light beam along a direction of a polarization axis out of the incident light beams and absorbs light beams along other directions so as to irradiate a predetermined polarized light is arranged on each of the incident side and the irradiation side of the optical modulator.

Such polarization plate has, e.g., a sapphire substrate with a high heat conductivity having a polarization film attached thereto, so that the heat generated due to the absorption of the light in the polarization film is radiated to the sapphire substrate.

According to the invention disclosed in Patent Document 1, however, since the polarization plate arranged on the downstream of the optical modulator is directly attached to the light-incident face of the cross dichroic prism, it is difficult that the heat conducted from the polarization film to the sapphire substrate is radiated to the outside.

To overcome such disadvantage, a following configuration might be suggested for example.

A prism support plate (base) for supporting a cross dichroic prism is made of heat-conductive material. The size of the sapphire substrate of the polarization plate is increased. Further, the sapphire substrate and the prism support plate are connected so that the heat conducted from the polarization film to the sapphire substrate is radiated to the prism support plate.

However, according to this configuration, since the size of the sapphire substrate should be increased, the cost of the optical device can not be reduced.

An object of the present invention is to provide an optical device and a projector capable of improving the heat radiation property of an optical conversion film at low cost.

SUMMARY OF THE INVENTION

An optical device according to a first aspect of the present invention, includes: a plurality of optical modulators for respectively modulating a plurality of color lights according to image information; a color-combining optical device for combining and irradiating the respective color lights modulated by the optical modulators; a base made of heat-conductive material and fixed to at least either one of a pair of faces crossing with a light-incident face of the color-combining optical device; an optical conversion plate arranged on the downstream of the each optical modulator, the optical conversion plate having an optical conversion film for converting an optical property of a light beam irradiated from the optical modulator, and a transparent member made of heat-conductive material on which the optical conversion film is attached; and a retaining plate made of heat-conductive material for supporting and fixing the optical conversion plate, the retaining plate having an opening for allowing the light beam to pass therethrough, and the retaining plate is fixed to a lateral face of the base.

The optical conversion film may be, for example, a polarization film, a phase film, a color correction film, a view angle enlarging film or the like.

The transparent substrate may be, made of, for example, sapphire, crystal, quartz, fluorite or the like.

According to the present invention, the optical device includes the retaining plate. Since the retaining plate supports and fixes the optical conversion plate and is fixed to the lateral face of the base, the heat generated at the optical conversion film due to the irradiation of a light beam from a light source can be radiated through a heat-conduction path from the transparent member to the retaining plate to the base.

Since the optical conversion plate is supported and fixed by the retaining plate, the size of the transparent member can be reduced to the minimum necessary size, thereby avoiding the cost increase of the optical device due to the size increase of the transparent member.

Thus the heat radiation property of the optical conversion film can be enhanced at low cost, thereby accomplishing the object of the present invention.

In the optical device according to the first aspect of the present invention, it is preferable that: the each optical modulator includes an optical modulator main body for modulating the color light in accordance with image information and a holder frame holding the optical modulator main body and having at least two holes; spacers made of heat-insulating material for fixing the optical modulator to the light-incident face of the color-combing optical device are inserted into the holes; and the retaining plate has spacer insertion portions into which the spacers can be inserted.

For instance, in the configuration where the optical modulator is fixed to the retaining plate fixed to the lateral face of the base through the spacers, the heat generated at the optical conversion plate causes a change in the size (expansion, contraction) of each component of the spacers and the retaining plate. Therefore, if the thermal expansion coefficient of the retaining plate and that of the spacers are different, the displacement of the optical modulator might be caused by the change in size of the each component.

The spacer insertion portions may be holes, cutouts or the like into which the spacers can be inserted.

The spacers may be made of, for instance, synthetic resin such as acrylic material.

In the present invention, since the retaining plate has the spacer insertion portions, the optical modulator is fixed to the light-incident face of the color-combining optical device through the spacers. With this configuration, even if the heat generated at the optical conversion plate causes the change in the size of the retaining plate, the displacement of the optical modulator is evitable. This prevents a change in the relative position of the plurality of optical modulators, thereby avoiding the pixel displacement in an optical image formed by the optical device.

Since the spacers are made of heat-insulating material, the heat conduction between the color-combining optical device and the holder frame on a heat-conduction path from the retaining plate to the base to the color-combining optical device to the spacers to the holder frame can be blocked. This prevents the heat generated in the optical modulator main body from being conducted to the optical conversion plate through the above path, as well as the heat generated at the optical conversion plate from being conducted through the above path to the optical modulator main body. Accordingly, the optical modulator main body and the optical conversion plate can be independently and efficiently cooled.

Even if the spacer is in contact with an end of the spacer insertion portion of the retaining plate, the thermal interference between the optical modulator main body and the optical conversion plate is avoidable in the same manner as the above description.

Preferably, the optical device according to the first aspect of the present invention includes at least two said optical conversion plates as a first optical conversion plate and a second optical conversion plate, and the retaining plate includes: a plate member supporting and fixing the first optical conversion plate at the periphery of the opening; and a protrusion protruding from the plate member toward an out-of-plane direction and supporting and fixing the second optical conversion plate.

The at least two optical conversion plates may be at least any two of a polarization plate, a phase plate, a color correction plate and a view angle compensation plate. Alternatively, they may be at least two optical conversion plates having the same function, such as the polarization plates.

The protrusion is only required to protrude from the plate member to the out-of-plane direction of the plate member. Specifically, the protrusion may protrude from the plate member toward the light-incident side, or may protrude from the plate member toward the light-irradiation side.

According to the present invention, since the retaining plate includes the plate member and the protrusion, the retaining plate can support and fix at least two optical conversion plates. The at least two optical conversion plates are supported and fixed by the retaining plate at different positions in the out-of-plane direction. Therefore, an air passage is formed between the optical conversion plates, and thus the optical conversion plates can be efficiently cooled if a fan is used for cooling the optical device.

If the protrusion is formed to protrude from the plate member toward the light-irradiation side, the protrusion and the optical conversion plate supported and fixed by the protrusion is positioned between the plate member and the color-combining optical device. With this configuration, at least two optical conversion plates can be supported and fixed by the retaining plate without increasing the size of the optical device.

Preferably, in the optical device according to the above-described present invention, the plate member has a bonding portion attached to the lateral face of the base and a support portion supporting and fixing the first optical conversion plate, and the bonding portion and the support portion are flush.

The first optical conversion plate may be supported and fixed at either the light-incident side of the support portion or the light-irradiation side of the support portion.

According to the present invention, the plate member has the bonding portion and the support portion, and the bonding portion and the support portion are flush. Therefore, the retaining plate can be easily produced, and thus reducing the production cost of the optical device.

Preferably, as an alternative configuration of the optical device according to the above-described present invention, the plate member has a bonding portion attached to the lateral face of the base and a support portion supporting and fixing the first optical conversion plate, and the support portion is recessed relative to the bonding portion toward a protruding direction of the protrusion.

The first optical conversion plate may be supported and fixed at either the light-incident side of the support portion or the light-irradiation side of the support portion.

According to the present invention, the plate member has the bonding portion and the support portion which is recessed relative to the bonding portion toward the protruding direction of the protrusion. For instance, if the protrusion protrudes from the plate member toward the light-irradiation side, the protrusion and the second optical conversion plate supported and fixed by the protrusion are arranged between the plate member and the color-combining optical device, and the support portion and the first optical conversion plate supported by the support portion are arranged at the light-irradiation side of the plate member. With this configuration, at least two optical conversion plates can be supported and fixed by the retaining plate without increasing the size of the optical device. Further, in the above case, if the first optical conversion plate is supported and fixed by the support portion at the side away from the protrusion, a predetermined clearance can be formed between the first optical conversion plate and the second optical conversion plate supported and fixed by the protrusion. Therefore, if a fan is used for cooling the optical device, the clearance formed between these optical conversion plates can serve as an air passage, and thus further efficiently cooling these optical conversion plates.

In contrast, for instance, if the protrusion protrudes from the plate member toward the light-incident side, the support portion and the first optical conversion plate supported and fixed by the support portion are arranged away from the light-incident face of the color-combining optical device. With this configuration, a predetermined clearance can be formed between the first optical conversion plate supported by the support portion and the light-incident face of the color-combining optical device. Therefore, if a fan is used for cooling the optical device, the clearance formed between the first optical conversion plate and the light-incident face of the color-combining optical device can also serve as an air passage, and thus further efficiently cooling the at least two optical conversion plates supported and fixed by the support portion and the protrusion.

Preferably, as another alternative configuration of the optical device according to the present invention, the plate member has a bonding portion attached to the lateral face of the base and a support portion supporting and fixing the first optical conversion plate, and the support portion is recessed relative to the bonding portion toward direction opposite to the protruding direction of the protrusion.

The first optical conversion plate may be supported and fixed at either the light-incident side of the support portion or the light-irradiation side of the support portion.

According to the present invention, the plate member has the bonding portion and the support portion which is recessed relative to the bonding portion toward the direction opposite to the protruding direction of the protrusion. With this configuration, a sufficient clearance can be formed between the first optical conversion plate supported and fixed by the support portion and the second optical conversion plate supported and fixed by the protrusion. Therefore, if a fan is used for cooling the optical device, the clearance formed between these optical conversion plates can serve as an air passage, and thus further efficiently cooling these optical conversion plates.

If the protrusion is formed to protrude from the plate member toward the light-irradiation side, the efficiency for cooling the optical conversion plates is further enhanced and the size of the optical device can be reduced.

Preferably, in the optical device according to the above-described present invention, the retaining plate is formed by sheet metal processing, and the protrusion is formed by cutting and folding a part of the plate member.

According to the present invention, the retaining plate is formed by sheet metal processing, the retaining plate can be easily produced, and thus further reducing the production cost of the optical device.

Preferably, the optical device according to the first aspect of the present invention, a first support face protruding toward the inner side of the opening and supporting and fixing a light-incident face of the optical conversion plate and a second support face protruding toward the inner side of the opening and supporting and fixing a light-irradiation face of the optical conversion plate are formed at the periphery of the opening of the retaining plate, and the first support face and the second support face are so positioned to have no planar interference with each other.

According to the present invention, the first support face and the second support face are formed on the periphery of the opening of the retaining plate. The first support face and the second support face are so positioned to have no planar interference with each other, and hence they can support and fix both of the light-incident face and light-irradiation face of the optical conversion plate. Therefore, the optical conversion plate can be securely supported and fixed.

Since both of the light-incident face and the light-irradiation face of the optical conversion plate are supported and fixed by the retaining plate, the temperature distribution in the optical conversion plate becomes uniform, thereby preventing a local overheat in the optical conversion plate. Therefore, the optical image formed by the optical device can be kept clear.

Preferably, the optical device according to the above-described present invention, the optical conversion films are respectively attached to a light-incident face and a light-irradiation face of the transparent member of the optical conversion plate.

For instance, the optical conversion films respectively attached to the light-incident face and the light-irradiation face of the transparent member may be any two of the above-mentioned polarization film, the phase film, the color correction film and the view angle compensation film. Alternatively, optical conversion plates having the same function, such as the polarization films may be respectively attached to the light-incident face and the light-irradiation face of the transparent member.

According to the present invention, the optical conversion films are respectively attached to the light-incident face and the light-irradiation face of one transparent member, the number of the transparent member is reduced to the minimum necessary number and consequently the production cost of the optical device can be further reduced.

Preferably, the optical device according to the first aspect of the present invention, the base fixed to either one of the pair of faces crossing with the light-incident face of the color-combining optical device has a hole for allowing the cooling air to flow between the color-combining optical device and the retaining plate.

According to the present invention, the base fixed to either one of the pair of faces crossing with the light-incident face of the color-combining optical device has the hole for circulating the cooling air. Therefore, for instance, if a fan is used for cooling the optical device, the cooling air can be blown between the color-combining optical device and the retaining plate through the hole of the base, thereby further enhancing the heat radiation property of the optical conversion plate.

Such configuration is particularly preferable to an optical device including at least two optical conversion plates as a first optical conversion plate and a second optical conversion plate, in which a retaining plate includes: a plate member supporting and fixing the first optical conversion plate at the periphery of the opening; and a protrusion protruding from the plate member toward the light-irradiation direction and supporting and fixing the second optical conversion plate. With this configuration, the cooling air through the hole of the base can be efficiently blown to the both faces of the second optical conversion plate that is supported by the protrusion and is arranged between the plate member and the color-combining optical device, and one face of the first optical conversion plate supported and fixed by the support potion.

Preferably, the optical device according to the above-described present invention, another base fixed to the other face of the pair of faces crossing with the light-incident face of the color-combining optical device includes: a cutout for discharging the cooling air flowing between the color-combining optical device and the retaining plate to the outside; and a regulating portion extending from an edge thereof toward the opposing base to guide the cooling air flowing between the color-combining optical device and the retaining plate to the cutout.

According to the present invention, the base fixed to the other face of the pair of faces crossing with the light-incident face of the color-combining optical device has the cutout and the regulating portion. Therefore, for instance, if a fan is used for cooling the optical device, the fresh cooling air can be always circulated while preventing the cooling air flown between the color-combining optical device and the retaining plate from staying therein. This can further enhances the heat radiation property of the optical conversion plate.

A projector according to second aspect of the present invention comprising: a light source; the above-described optical device; and a projection optical device for projecting an optical image irradiated from the optical device in an enlarged manner.

According to the present invention, since the projector has the above-described optical device, the same functions and advantages as the above-described optical device can be obtained.

Also, since the projector includes the low-cost optical device, the production cost of the projector can be reduced.

Further, since the projector includes the optical device having a good cooling efficiency, it can project a high-quality optical image with no pixel displacement on a screen. Moreover, since the luminance of the light beam irradiated from the light source can be set at a high level, a clear optical image can be projected on the screen. Furtherer, there is no need to enhance the cooling function of a fan and the like, thus contributing the reduction in power consumption, noise and size of the projector.

DETAILED DESCRIPTION OF PREFERRED EMBODIMENT(S)

[First Embodiment]

A first embodiment of the present invention will be described below with reference to the attached drawings.

[1] Structure of Projector

Figure 1:
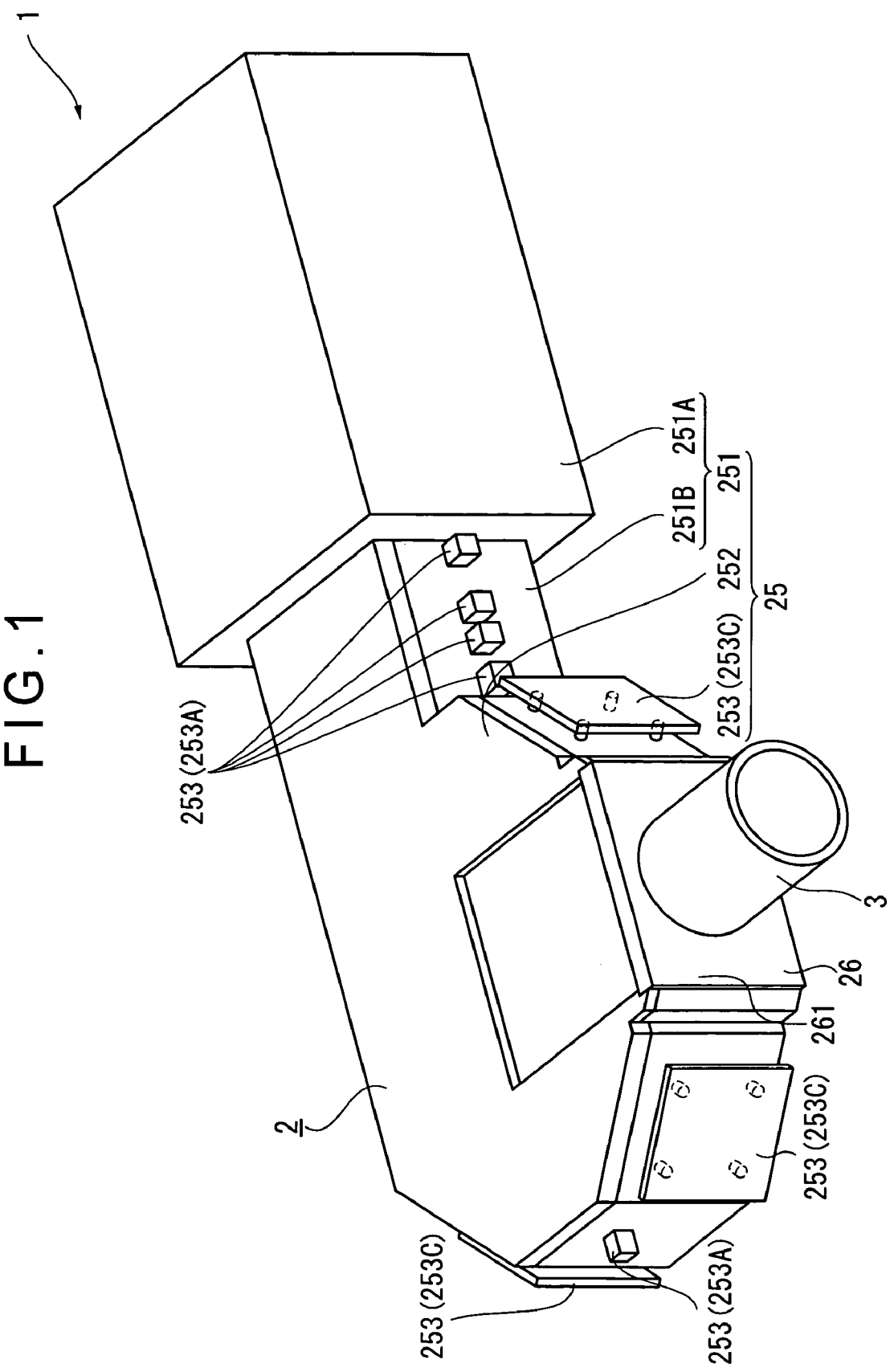
FIG. 1 is a perspective view showing a structure of a projector having an optical device according to a first embodiment.

FIG. 1 is a perspective view showing a structure of a projector 1 having an optical device according to a present embodiment.

The projector 1 modulates a light beam irradiated from a light source in accordance with image information and projects the light beam on a projection surface of a screen or the like in an enlarged manner. The projector 1, as shown in FIG. 1, has an optical unit 2 having a substantially L-shape in plan view and a projection lens 3 as a projection optical device connected to an end of the optical unit 2.

Though not particularly shown, the projector 1 includes a power source unit for providing electric power supplied from the outside to the components of the projector 1, a control board for controllably driving a below-described liquid crystal panel of the optical unit 2, and a cooling unit having a cooling fan for blowing the cooling air to the components of the projector 1, in addition to the optical unit 2 and the projection lens 3.

Under the control of the control board (not shown), the optical unit 2 forms an optical image in accordance with image information provided from the outside. Referring to FIG. 1, the optical unit 2, which will be described later in detail, includes a light guide 25 having a lower light guide 251 shaped like a container and an upper light guide 252 covering an opening section of the lower light guide 251, a plurality of optical components arranged and housed in the light guide 25, and a head 26 connected to the light guide 25 to support the projection lens 3.

The projection lens 3 enlarges and projects the optical image modulated by the optical unit 2 in accordance with image information. The projection lens 3, which is a lens set including a plurality of lenses housed in a cylindrical lens barrel, includes a lever (not shown) for changing the relative position of the plurality of lenses so as to adjust focus and magnification of the projected image.

[2] Structure of Optical Unit 2

[2-1] Configuration of Optical Unit 2

Figure 2:
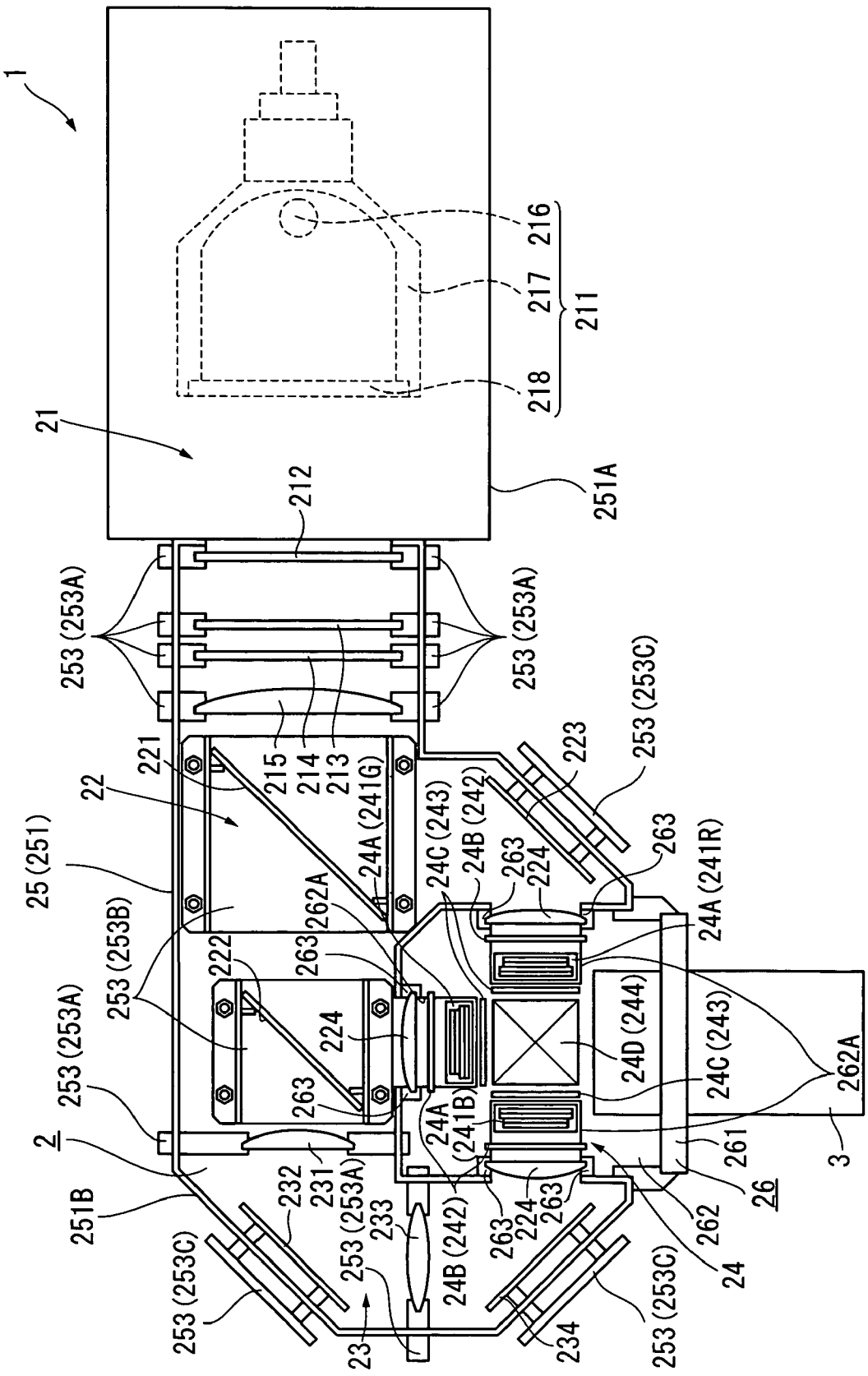
FIG. 2 is a plan view schematically showing an inner structure of an optical unit according to the aforesaid embodiment.

FIG. 2 is a plan view schematically showing an inner structure of the optical unit 2. Specifically, FIG. 2 is an illustration of the optical unit 2 with the upper light guide 252 removed.

As shown in FIG. 2, the plurality of optical components housed in the light guide 25 include an integrator illuminating optical system 21, a color-separating optical system 22, a relay optical system 23, and an optical device 24 integrating an optical modulator and a color-combining optical device.

The integrator illuminating optical system 21 is an optical system for equalizing the illuminance of the light beam irradiated from the light source on a plane orthogonal to an illumination optical axis. As shown in FIG. 2, the integrator illuminating optical system 21 has a light source device 211, a first lens array 212, a second lens array 213, a polarization converter 214, and a superposing lens 215.

The light source device 211 has a light source lamp 216 (radial light source), a reflector 217, and an anti-explosion glass 218 covering a light-irradiation face of the reflector 217. The radial light beam irradiated from the light source lamp 216 is reflected by the reflector 217 to be a substantially parallel light beam and is irradiated toward the outside. In the present embodiment, a high-pressure mercury lamp is used as the light source lamp 216 and a parabolic mirror is used as the reflector 217. Without limiting to a high-pressure mercury lamp, a metal halide lamp or a halogen lamp may be applicable as the light source lamp 216. Further, though a parabolic mirror is used as the reflector 217, a parallelizing concave lens disposed on an irradiation face of a reflector of an ellipsoidal mirror may alternatively be used.

The first lens array 212 has small lenses arranged in a matrix form, the lenses each having a substantially rectangular shape when viewed from an illumination optical axis direction. The respective small lenses separate the light beam irradiated from the light source lamp 216 into sub-beams and emit the sub-beams in the illumination optical axis direction.

The second lens array 213, which has substantially the same configuration as the first lens array 212, includes small lenses arranged in a matrix form. The second lens array 213 focuses images of the respective small lenses of the first lens array 212 onto image formation areas of below-described liquid crystal panels 241R, 241G and 241B of the optical device 24 together with the superposing lens 215.

The polarization converter 214 converts the light from the second lens array 213 into a substantially uniform polarized light, thereby enhancing the light utilization efficiency of the optical device 24.

Specifically, respective sub-beams converted into the substantially uniform polarized light by the polarization converter 214 are substantially superposed on the image formation areas of the below-described liquid crystal panels 241R, 241G and 241B of the optical device 24 by the superposing lens 215 eventually. Since only one-type of polarized light can be used in a projector using the liquid crystal panels 241R, 241G and 241B that modulate polarized light, approximately half of the light beam from the light source lamp 216 emitting a random polarized light cannot be used. Accordingly, with the use of the polarization converter 214, all of the light beams irradiated from the light source lamp 216 are converted into a substantially uniform polarized light to enhance the light utilization efficiency of the optical device 24. Such polarization converter 214 is disclosed in, for instance, Japanese Patent Laid-Open Publication No. H08-304739.

The color-separating optical system 22 has two dichroic mirrors 221 and 222, and a reflection mirror 223. The plurality of sub-beams irradiated from the integrator illuminating optical system 21 are separated into three color lights of red (R), green (G) and blue (B) by the two dichroic mirrors 221 (translator's comment: the two dichroic mirrors 221 and 222).

The relay optical system 23 has an incident-side lens 231, a relay lens 233, and reflection mirrors 232 and 234. The relay optical system 23 guides the color light (blue light) separated by the color-separating optical system 22 toward the below-described liquid crystal panel 241B of the optical device 24.

The dichroic mirror 221 of the color-separating optical system 22 transmits a green light component and a blue light component of the light beam irradiated from the integrator illuminating optical system 21 and reflects a red light component. The red light reflected by the dichroic mirror 221 is reflected again by the reflection mirror 223. Then it passes through a field lens 224 and reaches to the liquid crystal panel 241R for red color. The field lens 224 converts the respective sub-beams irradiated from the second lens array 213 into a light beam parallel to a central axis (main beam) thereof. The field lenses 224 provided on the light-incident side of other liquid crystal panels 241G and 241B function in the same manner.

Out of the blue and green lights passed through the dichroic mirror 221, the green light is reflected by the dichroic mirror 222. Then it passes thorough the field lens 224 and reaches to the liquid crystal panel 241G for green light. In the meantime, the blue light passes through the dichroic mirror 222 and the relay optical system 23, and then passes through the field lens 224 to reach the liquid crystal panel 241B for blue light.

Herein, in view of the fact that the optical path length of the blue light is longer than those of other color lights, the relay optical system 23 is used for the blue light to prevent deterioration of the light utilization efficiency due to the light dispersion and the like. In other words, the relay optical system 23 is used for transmitting the sub-beams incident on the incident-side lens 231 directly to the field lens 224. Although the blue light out of the three color lights passes through the relay optical system 23, the red light, for instance, may alternatively pass through the relay optical system 23.

The optical device 24 modulates the incident light beam in accordance with image information to form a color image. The optical device 24 includes an incident-side polarization unit 24B having three incident-side polarization plates 242 on which the respective color lights separated by the color-separating optical system 22 are incident, an optical modulator 24A arranged on the downstream of the respective incident-side polarization plates 242 and having the liquid crystal panels 241R, 241G and 241B (optical modulator main bodies), an irradiation-side polarization unit 24C having an irradiation-side polarization plate 243 (optical conversion plate), a prism unit 24D having a cross dichroic prism 244 (color-combining optical device), and pin spacers 24E. The optical modulator 24A, the incident-side polarization unit 24B, the irradiation-side polarization unit 24C, the prism unit 24D are integrated through the pin spacers 24E, thus constituting the optical device 24. The structure of the optical device 24 will be described later in more detail.

[2-2] Structure of Light Guide 25

As shown in FIG. 1 or FIG. 2, the light guide 25 includes the lower light guide 251 for housing the above-described optical components 21, 22 and 23, the upper light guide 252 covering the opening section of an upper face of the lower light guide 251, a positioning member 253 for positioning the optical components 21, 22 and 23 excluding the light source device 211 to predetermined positions in the lower light guide 251.

Figure 3:
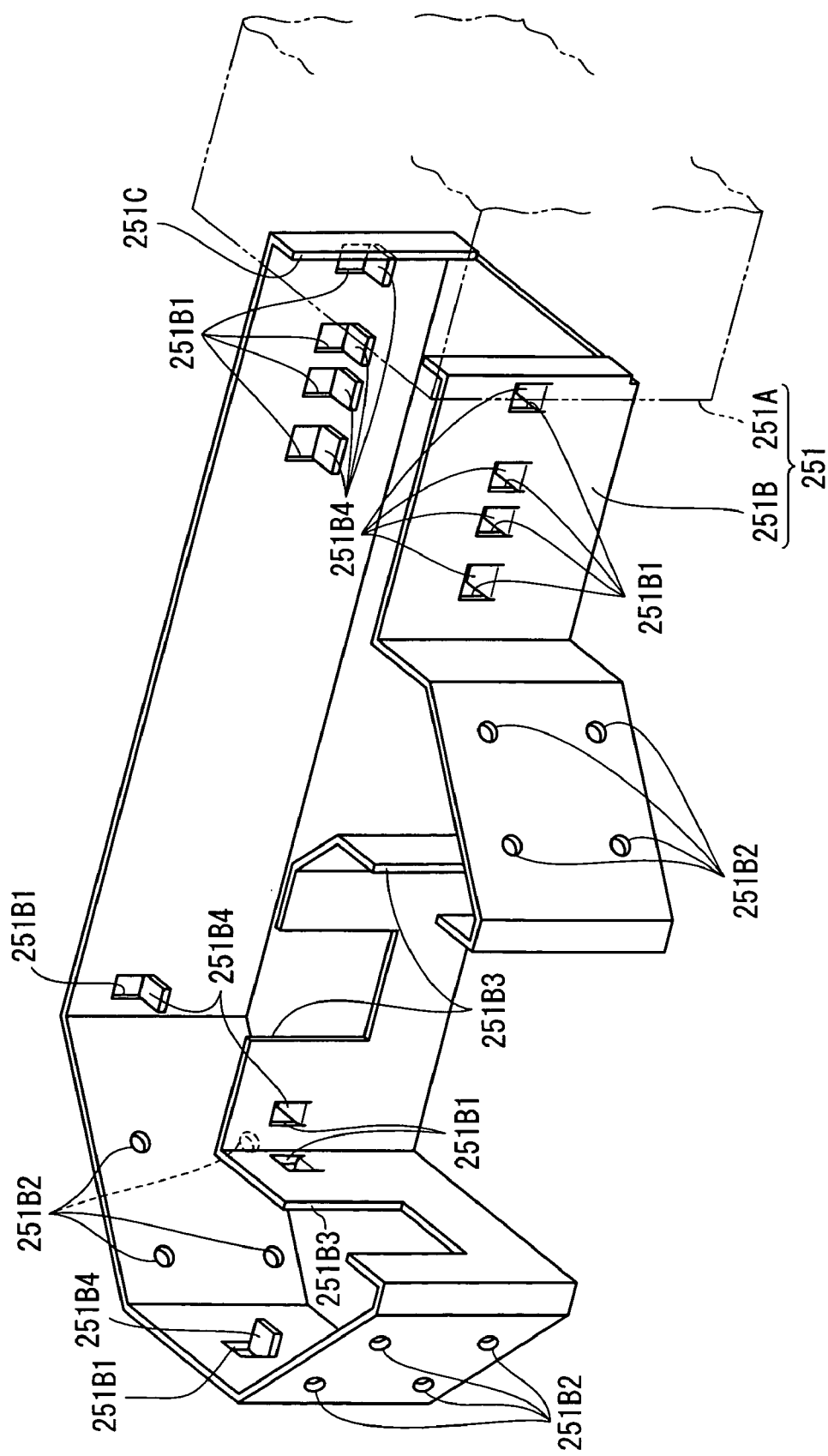
FIG. 3 is a perspective view showing a structure of a lower light guide according to the aforesaid embodiment.

FIG. 3 is a perspective view showing a structure of the lower light guide 251.

As shown in FIGS. 1 to 3, the lower light guide 251 formed by means of sheet metal processing over an aluminum plate includes a light source housing 251A for housing the light source device 211 and a component housing 251B for housing the optical components 21, 22 and 23 (FIG. 2) excluding the light source device 211. The light source housing 251A and the component housing 251B are formed in a container shape by means of a drawing processing, the lower side of the light source housing 251A being opened whereas the upper side of the component housing 251B being opened. At a joint section of the light source housing 251A and the component housing 251B, an opening 251C (FIG. 3) is formed by cutting etc. so that the light beam irradiated from the light source device 211 can passes therethrough.

The light source housing 251A and the component housing 251B may be formed with a single plate by means of drawing processing. Alternatively, the light source housing 251A and the component housing 251B may be independently formed with two plates by means of drawing processing so that the two housings are mechanically joined by screws etc. or by welding.

In the light source housing 251A, the light source device 211 (FIG. 2) is housed and arranged from the opening (not shown) of the lower side. Though not shown, a lateral face of the light source housing 251A has a slit-like opening formed by cutting etc. so as to prevent the air heated by the heat generated in the light source device 211 from staying inside the light source housing 251A.

As shown in FIG. 3, an end of the component housing 251B is connected to the light source housing 251A. The other end shaped like a container having a substantially C-shape in plan view is connected to the head 26.

In the component housing 251B, a plurality of holes 251B1 are formed on the lateral face by cutting and folding parts of the lateral face to the inner side of the component housing 251B corresponding to the positions of the optical components 212 to 215, 231 and 233 (FIG. 2). Further, a plurality of circular holes 251B2 are formed on the lateral face to penetrate toward the inside corresponding to the positions of the optical components 223, 232 and 234 (FIG. 2). Furthermore, cutouts 251B3 are formed on an inner lateral face of the substantially C-shape (in plan view) by cutting etc. so that the three color lights irradiated from the light source device 211 (FIG. 2) and separated by the color-separating optical system 22 (FIG. 2) can pass through the cutouts 251B3 toward the optical device 24 (FIG. 2).

Though not shown, a plurality of burring holes with screw grooves are formed on a bottom face and an upper end of the component housing 251B.

As shown in FIG. 1, the upper light guide 252 is an aluminum plate and so formed by cutting etc. to cover an upper opening section of the component housing 251B of the lower light guide 251. Though not shown, a plurality of holes are formed on the upper light guide 252 so that the upper light guide 252 is fixed to the lower light guide 251 by screws etc. through the holes and burring holes (not shown) formed on the lower light guide 251.

The inner face of the light source housing 251A and the component housing 251B of the above-described lower light guide 251 and the lower face of the upper light guide 252 are coated with anodized black-aluminum.

As shown in FIG. 1 or 2, the positioning member 253 includes first positioning members 253A for respectively positioning the first lens array 212, the second lens array 213, the polarization converter 214, the superposing lens 215, the incident-side lens 231 and the relay lens 233, second positioning members 253B (FIG. 2) for respectively positioning the dichroic mirrors 221 and 222, and third positioning members 253C for respectively positioning the reflection mirrors 223, 232 and 234. The detailed description of the positioning member 253 is included in a below description of holding structures of the optical components.

[2-3] Holding Structure of Optical Component

The holding structures of the optical components 21, 22 and 23 excluding the light source device 211 in the light guide 25 will be explained.

The holding structures of the optical components can be classified into three holding structures by grouping similar structures. In other words, the holding structures can be classified into a lens holding structure for holding the first lens array 212, the second lens array 213, the polarization converter 214, the superposing lens 215, the incident-side lens 231 and the relay lens 233, a dichroic mirror holding structure for holding the dichroic mirrors 221 and 222, and a reflection mirror holding structure for holding the reflection mirrors 223, 232 and 234. In the following, the above three holding structures will be described in turn.

[2-3-1] Lens Holding Structure

Figure 4:
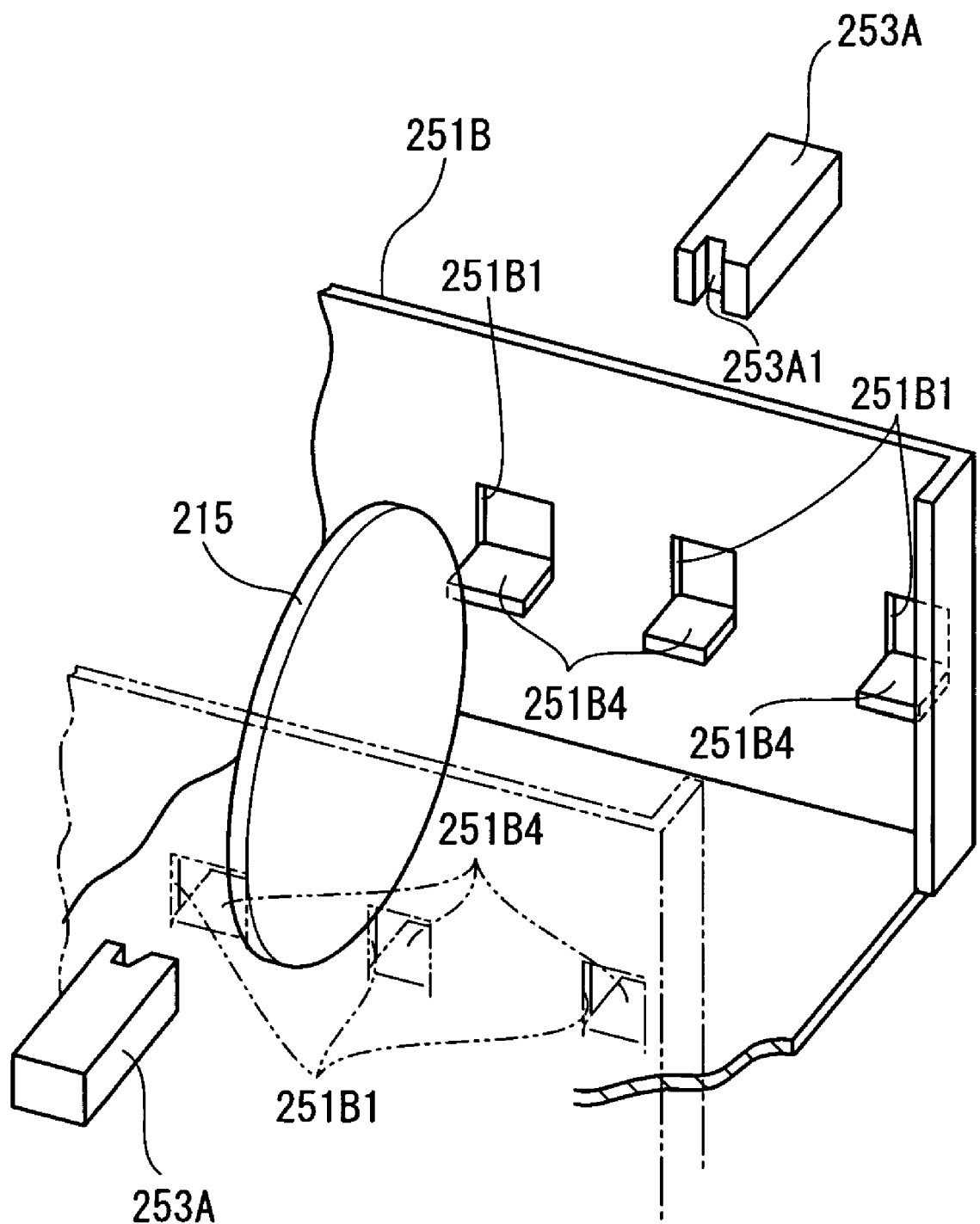
FIG. 4 is an illustration to explain a lens holding structure according to the aforesaid embodiment.

FIG. 4 is an illustration to explain the lens holding structure. As mentioned above, since the holding structures of the optical components 212 to 215, 231 and 233 have similar structures, the holding structure of the superposing lens 215 will mainly be described here.

As shown in FIG. 4, the superposing lens 215 with a substantially circular shape in plan view is a convex lens, the light-incident face and the light-irradiation face of which are spherically domed. Two first positioning members 253A out of the above-described plurality of first positioning members 253A are used for holding the superposing lens 215.

The first positioning member 253A made of ultraviolet-ray transmittable synthetic resin (acrylic material) is a quadratic prism member to be inserted through the hole 251B1 formed on the lateral face of the lower light guide 251. A groove 253A1 having a substantially V-shaped cross-section is formed on a face of the quadratic prism of the first positioning member 253A. The groove 253A1 is formed to have a shape substantially same as that of a cross-section of an outer periphery of the superposing lens 215.

In the hole 251B1 of the lower light guide 251, the cut and folded part of the lateral face serves as a support face 251B4 of the first positioning member 253A.

The first positioning members 253 (translator's comment: 253A) sandwich the superposing lens 215 from left and right directions by the groove 253A1 abutting on the outer periphery of the superposing lens 215 through the holes 251B1 formed on the lateral face of the lower light guide 251. At this time, an ultraviolet curable adhesive is filled between the first positioning member 253 (translator's comment: 253A) and the support face 251B4, and between the groove 253A1 of the first positioning member 253 (translator's comment: 253A) and the outer periphery of the superposing lens 215. The ultraviolet ray is irradiated through the first positioning member 253 (translator's comment: 253A) to cure the adhesive, so that the superposing lens 215 is held and fixed in the light guide 25.

Other holding structures of the optical components 212 to 214, 231 and 233 are similar to the above-described holding structure of the superposing lens 215.

[2-3-2] Dichroic Mirror Holding Structure

Figure 5:
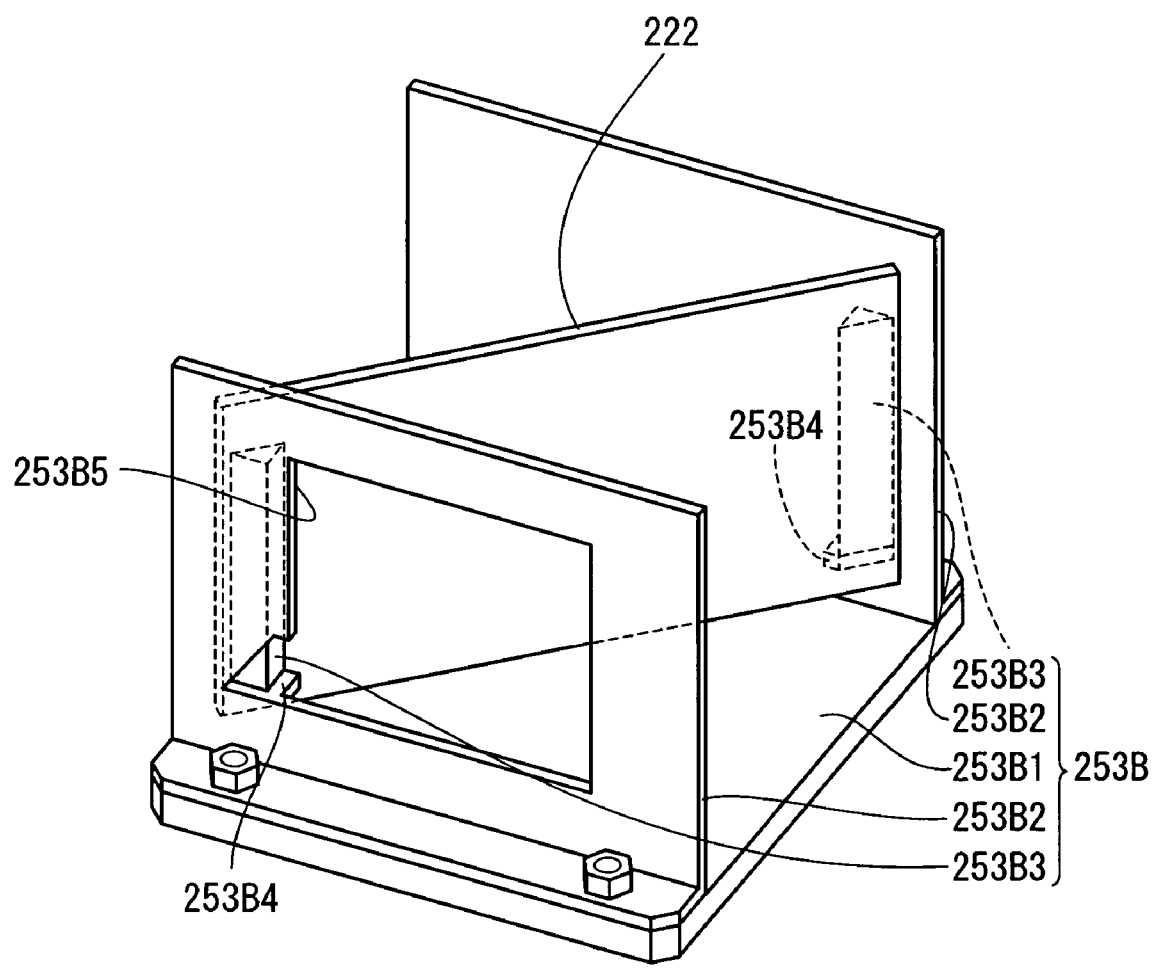
FIG. 5 is an illustration to explain a dichroic mirror holding structure according to the aforesaid embodiment.

FIG. 5 is an illustration to explain a dichroic mirror holding structure. As mentioned above, since the holding structures of the dichroic mirrors 221 and 222 have similar structures, the holding structure of the dichroic mirror 222 will mainly be described here.

As shown in FIG. 5, the dichroic mirror 222 with a substantially rectangular shape in plan view is held by the second positioning member 253B.

As shown in FIG. 5, the second positioning member 253B includes a plate-like base 253B1 fixed on a bottom face of the component housing 251B of the lower light guide 251, a pair of plate members 253B2 fixed on an upper face of the base 253B1 and having an L-shaped cross-section, and spacers 253B3 interposed between the pair of plate members 253B2 and left and right ends of the dichroic mirror 222.

The pair of plate members 253B2 facing with each other are arranged substantially in parallel to the lateral face of the component housing 251B of the lower light guide 251. A face of the L-shaped cross-section of each plate member 253B2 is fixed on the upper face of the base 253B1 and the other face thereof (vertical face) is extended upward from the base 253B1. The dichroic mirror 222 is diagonally arranged between the pair of plate members 253B2 so that left and right ends of the dichroic mirror 222 oppose to the vertical faces of the plate members 253B2.

In the pair of plate members 253B2, a part of the vertical face is cut and folded toward the opposing plate member 253B2 to form a triangular shape, which defines a support face 253B4 for supporting the spacer 253B3.

An opening 253B5 is formed on the vertical face near the field lens 224 (FIG. 2) out of the vertical faces of the pair of plate members 253B2 for allowing the green light reflected by the dichroic mirror 222 to pass therethrough.

The spacer 253B3 is a triangular prism member and is made of ultraviolet-ray transmittable synthetic resin (acrylic material) in the same manner as the first positioning member 253A. The spacer 253B3 is supported by the support face 253B4 and interposed between the left and right ends of the dichroic mirror 222 and the plate members 253B2. A slanted face of the triangular prism of the spacer 253B3 is configured to be substantially parallel to the dichroic mirror 222 diagonally arranged. The ultraviolet curable adhesive is filled between the spacer 253B3 and the support face 253B4, and between the slanted face of the spacer 253B3 and an outer periphery of the dichroic mirror 222. The ultraviolet ray is irradiated through the spacer 253B3 to cure the adhesive, so that the dichroic mirror 222 is held and fixed in the light guide 25.

The other holding structure of the dichroic mirror 221 is similar to the above-described holding structure of the dichroic mirror 222.

[2-3-3] Reflection Mirror Holding Structure

Figure 6:
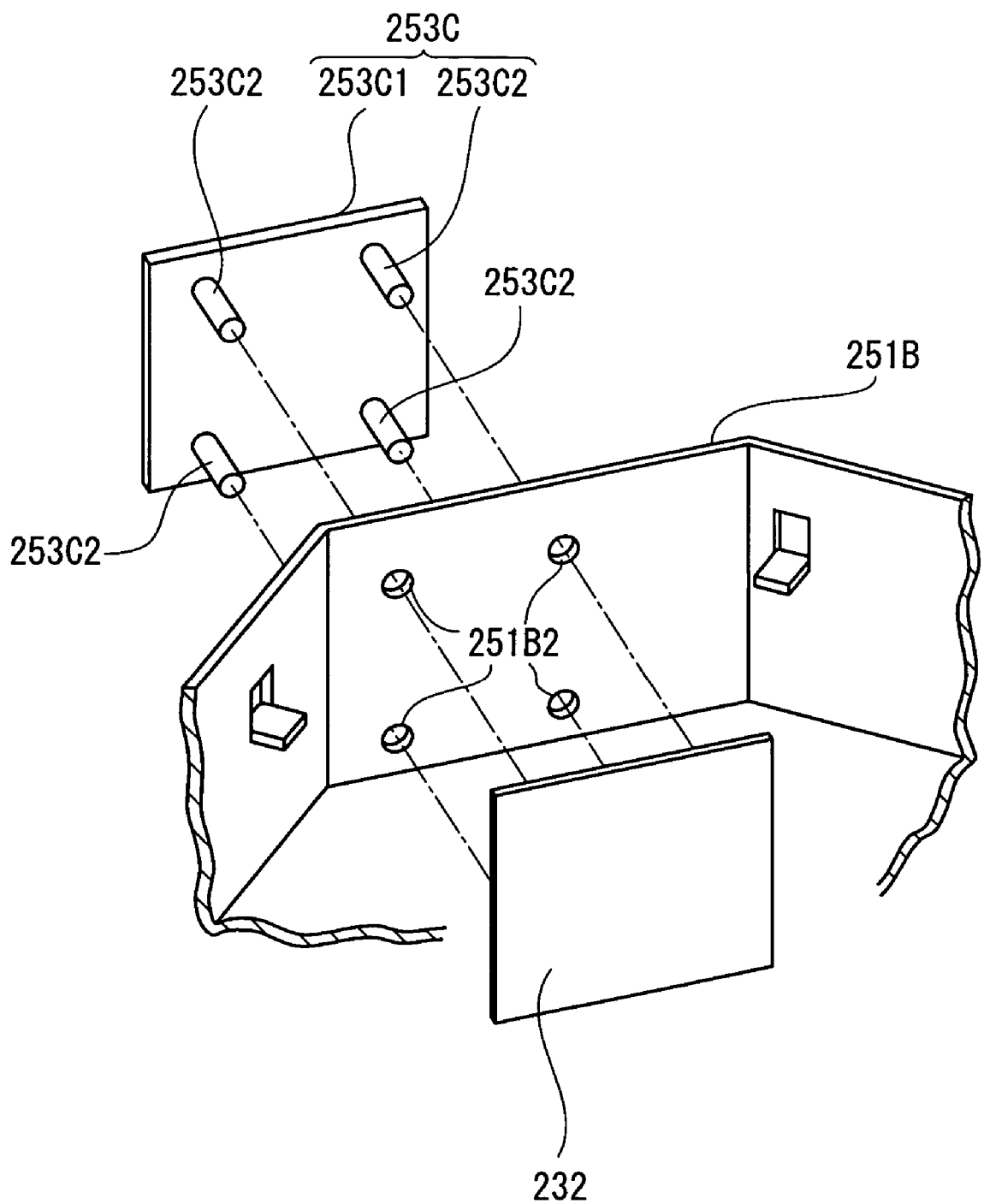
FIG. 6 is an illustration to explain a reflection mirror holding structure according to the aforesaid embodiment.

FIG. 6 is an illustration to explain a reflection mirror holding structure. As mentioned above, since the holding structures of the reflection mirrors 223, 232 and 234 have similar structures, the holding structure of the reflection mirror 232 will mainly be described here.

As shown in FIG. 6, the reflection mirror 232 has a substantially rectangular shape in plan view, on one face of which has a reflection face with highly reflective aluminum etc. being deposited. The above-described third positioning member 253C is used for holding the reflection mirror 232.

The third positioning member 253C made of ultraviolet-ray transmittable synthetic resin (acrylic material) includes a plate body 253C1 and cylindrical four pins 253C2 projected from four corners of a face of the plate body 253C1, the pins 253C2 being orthogonal to the face.

The pin 253C2 is inserted to the third positioning member 253C through the hole 251 B2 formed on the lateral face of the lower light guide 251 so that a tip end of the pin 253C2 abuts on a back face of a reflection face of the reflection mirror 232. An ultraviolet curable adhesive is filled between the pin 253C2 and the back face of the reflection face of the reflection mirror 232, and between the circumference of the pin 253C2 and the hole 251 B2. The ultraviolet ray is irradiated through the third positioning member 253C to cure the adhesive, so that the reflection mirror 232 is held and fixed in the light guide 25.

Other holding structures of the reflection mirrors 223 and 234 are similar to the above-described holding structure of the reflection mirror 232.

Though the above-described first positioning member 253A, the spacer 253B3 and the third positioning member 253C are made of acrylic material, they may be made of other ultraviolet-ray transmittable synthetic resins or, alternatively, may be made of optical glass, crystal, sapphire, quartz or the like.

Further, although a wide variety of adhesives are applicable as the ultraviolet curable adhesive used for the lens holding structure, the dichroic mirror holding structure and the reflection mirror holding structure, an adhesive composed mainly of acrylate and having the viscosity of 17000P is preferable.

[2-4] Structure of Head 26

The head 26 made of magnesium alloy has a substantially L-shape in lateral view. As shown in FIG. 2, the head 26 integrates the projection lens 3 and the optical device 24. The head 26 includes a lens supporter 261 formed on an outer vertical face of the substantially L-shape (in lateral view), a mount face 262 formed on an upper horizontal face of the substantially L-shape (in lateral view), and field lens holders 263 projected on the mount face 262.

Note that the head 26 may be made of aluminum, magnesium, titanium or alloy composed mainly of theses materials, without limiting to the magnesium alloy.

As shown in FIG. 1 or 2, the lens supporter 261 is formed in a rectangular shape, on which fixing female screw holes (not shown) are formed at four corners of the rectangular shape by penetrating through it in order to fix the projection lens 3. The lens supporter 261 supports and fixes the projection lens 3 by screwing screws etc. into the fixing female screw holes via holes (not shown) of the projection lens 3.

As shown in FIG. 2, the mount face 262 is formed in a substantially rectangular shape in plan view. The optical device 24 is mounted and fixed on the mount face 262 at the approximate center in a horizontal direction near the lens supporter 261. Four cutouts 262A for circulating the cooling air blown from the cooling unit (not shown) are formed on the mount face 262 at the side of the liquid crystal panels 241R, 241G and 241B.

The field lens holders 263 extends upward from corners of the cutouts 262A formed on the mount face 262 to support and fix the field lens 224.

For instance, a plurality of holes (not shown) are formed on the mount face 262 of the above-described head 26 so that the head 26 is fixed to the lower light guide 251 by screws etc. through the holes and the burring holes (not shown) formed on the lower light guide 251.

[3] Structure of Optical Device 24

The structure of the optical device 24 will be described with reference to FIG. 7.

Figure 7:
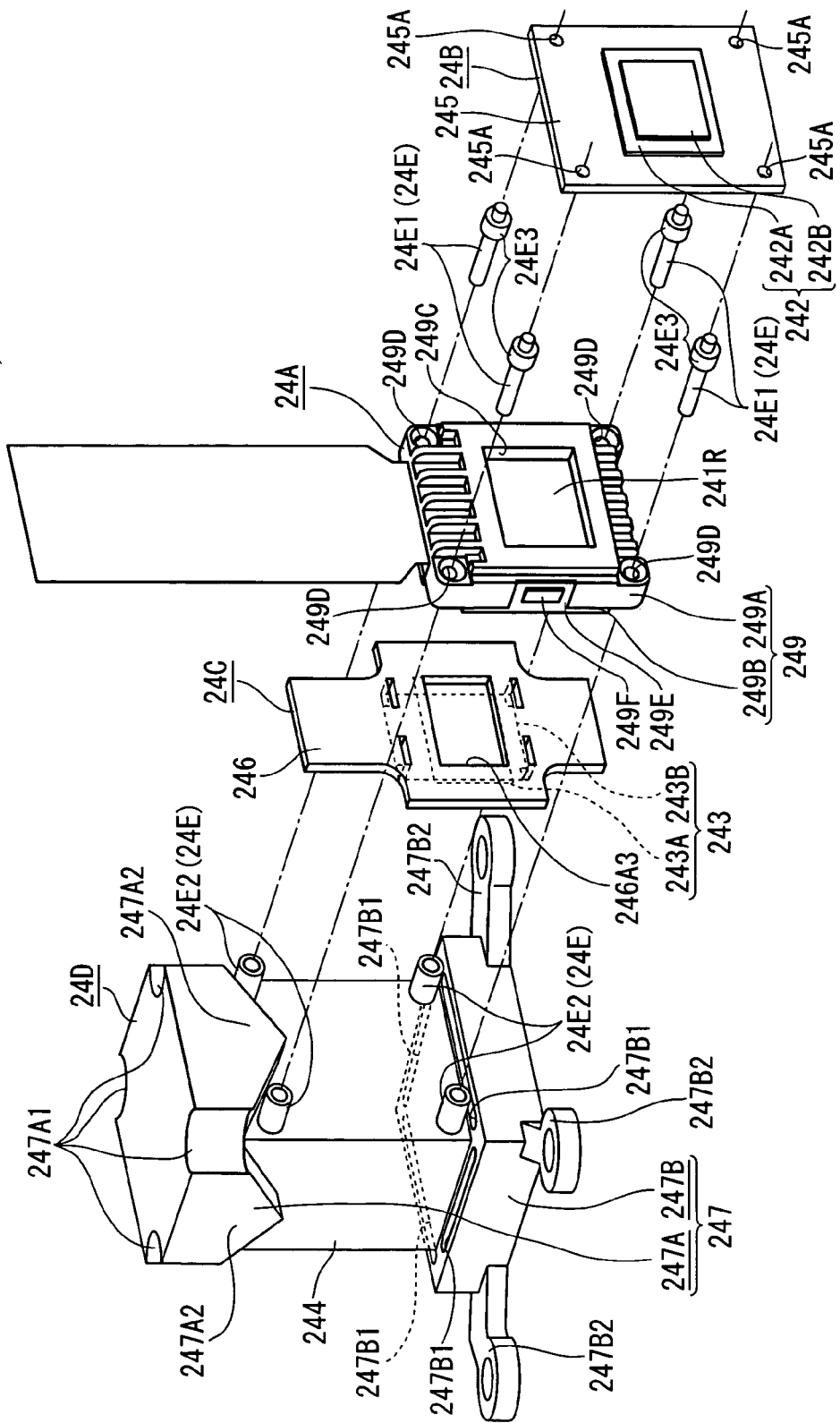
FIG. 7 is an exploded perspective view showing a structure of the optical device according to the aforesaid embodiment.

FIG. 7 is an exploded perspective view showing a structure of the optical device 24. In FIG. 7, only the side of the liquid crystal panel 241R for red light is exploded for simplifying the description. The sides of the liquid crystal panels 241G and 241B for green light and blue light are structured in the same manner.

As shown in FIG. 7, the optical device 24 includes the optical modulator 24A, the incident-side polarization unit 24B, the irradiation-side polarization unit 24C, the prism unit 24D, and the pin spacers 24E.

[3-1] Structure of Optical Modulator 24A

As shown in FIG. 7, the optical modulator 24A includes the liquid crystal panel 241R (241G, 241B) and a holder frame 249 for holding the liquid crystal panel 241R.

The liquid crystal panel 241R (241G, 241B) uses, for instance, a polycrystalline silicon TFT as a switching element, and has a pair of opposing transparent substrates with liquid crystal sealed therebetween. The liquid crystal panel 241R (241G, 241B) irradiates the light beam incident thereon through the incident-side polarization plates 242 after modulating the light beam in accordance with the image information.

The holder frame 249 includes a housing 249A for housing the liquid crystal panel 241R (241G, 241B) and a support plate 249B for pressing and fixing the liquid crystal panel 241R (241G, 241B) engaged and housed in the housing 249A.

The housing 249A and the support plate 249B have an opening 249C in a position corresponding to a panel face of the liquid crystal panel 241R (241G, 241B). The liquid crystal panel 241R (241G, 241B) is exposed through the opening 249C so that the exposed portion serves as the image formation area. That is, the red light (green light, blue light) is incident on the exposed portion of the liquid crystal panel 241R (241G, 241B), so that the optical image is formed in accordance with the image information.

On the housing 249A and the support plate 249B, holes 249D are formed on four corners so that the pin spacers 24E can be inserted.

As shown in FIG. 7, hooks 249E formed on both lateral faces of the support plate 249B are engaged with hook catchers 249F formed on the corresponding positions at the housing 249A, thereby fixing the housing 249A and the support plate 249B.

The holder frame 249 is made of lightweight material with a good heat conductivity, for instance, metal such as iron-nickel alloy (Invar and 42Ni—Fe etc.), magnesium alloy, aluminum alloy, carbon steel, brass, stainless or the like, or resin with a carbon filler such as carbon fiber and carbon nanotube added thereto (polycarbonate, poly phenylene sulfide, liquid crystal resin etc.).

[3-2] Structure of Incident-Side Polarization Unit 24B

Referring to FIG. 7, the incident-side polarization unit 24B includes the incident-side polarization plate 242 and an incident-side retaining plate 245 for supporting and fixing the incident-side polarization plate 242.

The incident-side polarization plate 242 only transmits a polarized light in a predetermined direction out of the respective color lights separated by the color-separating optical system 22 while absorbing other light beams. The incident-side polarization plate 242, as shown in FIG. 7, includes a substrate 242A, and a polarization film 242B attached to the light-incident face of the substrate 242A.

The substrate 242A is a rectangular plate made of sapphire glass. The substrate 242A therefore has a high heat conductivity of about 40 W/(m·K), a great hardness, a good resistance to scratch, and a high transparency. If the priority is given to the cost efficiency accepting a regular luminance, the crystal having a heat conductivity of about 10 W/(m·K) may be applicable. The substrate 242A may be made of quartz, fluorite or the like other than sapphire glass and crystal.

The polarization film 242B is a rectangular film. To obtain this film, a film-like substance made of polyvinyl alcohol (PVA) with iondine absorbed and dispersed therein is drawn in a predetermined direction, and then a cellulose acetate based film is laminated on both faces of the drawn film with adhesive.

The incident-side retaining plate 245 is formed in a substantially rectangular shape by means of sheet metal processing over an aluminum plate. The incident-side retaining plate 245 has holes 245A formed by cutting etc. on four corners thereof and an opening (not shown) allowing the transmission of the light beam irradiated from the incident-side polarization plate 242. The incident-side polarization plate 242 is bonded and fixed to a periphery of the opening (not shown) of the light-incident face of the incident-side retaining plate 245.

[3-3] Structure of Irradiation-Side Polarization Unit 24C

Figure 8:
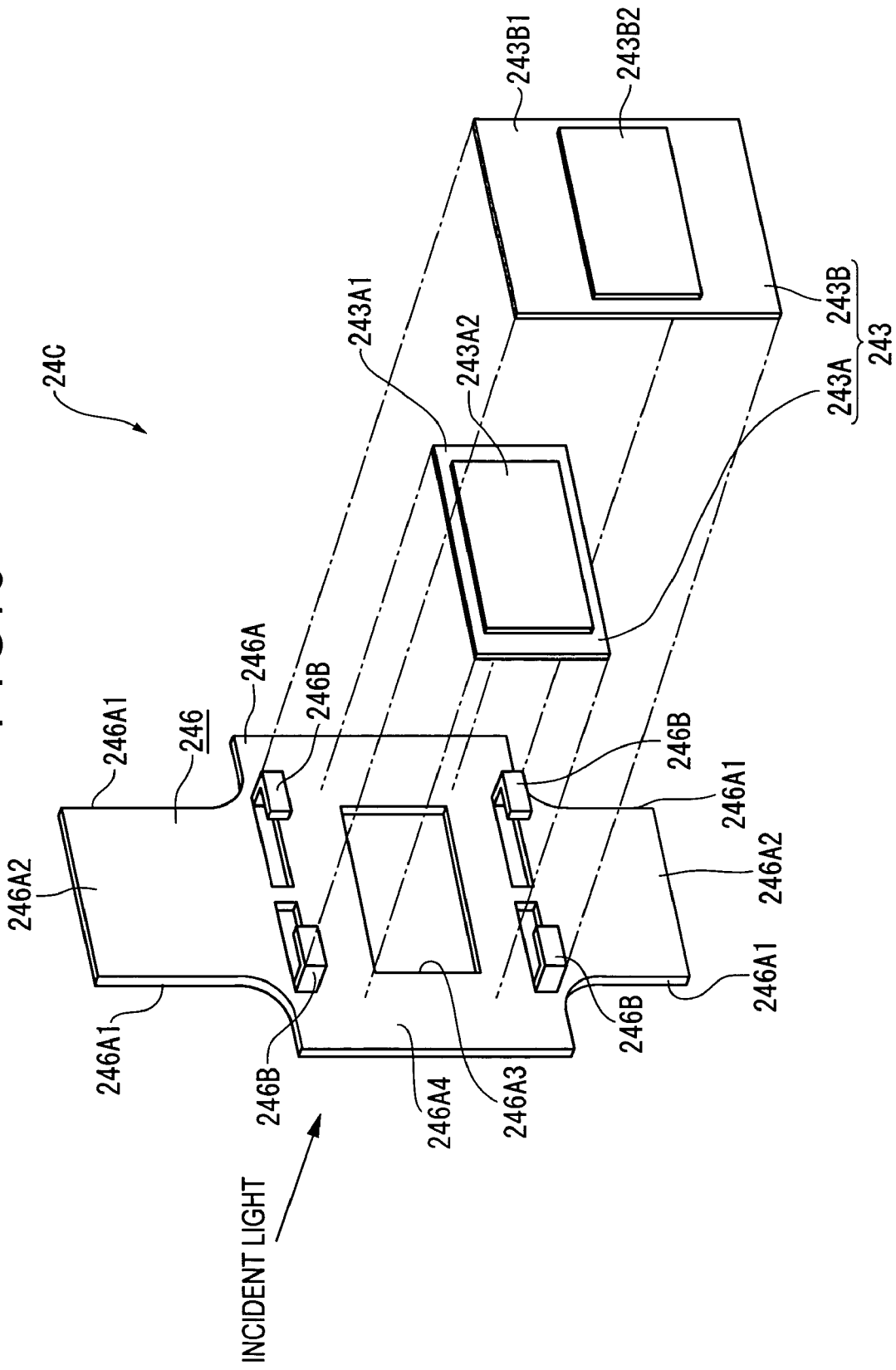
FIG. 8 is an exploded perspective view showing a structure of an irradiation-side polarization unit in detail according to the aforesaid embodiment.

FIG. 8 is an exploded perspective view showing a structure of the irradiation-side polarization unit 24C in detail.

Referring to FIG. 8, the irradiation-side polarization unit 24C includes the irradiation-side polarization plate 243 and an irradiation-side retaining plate 246 for supporting and fixing the irradiation-side polarization plate 243.

The irradiation-side polarization plate 243, which is configured substantially in the same manner as the incident-side polarization plate 242, only transmits a polarized light in a predetermined direction out the light beam irradiated by the liquid crystal panels 241R (241G, 241B) while absorbing other light beams. A polarization axis of the transmitted polarized light is set orthogonal to the polarization axis of the polarized light passed through the incident-side polarization plate 242. As shown in FIG. 8, the irradiation-side polarization plate 243 includes a first irradiation-side polarization plate 243A and a second irradiation-side polarization plate 243B.

The first irradiation-side polarization plate 243A includes a substrate 243A1 (transparent member) and a polarization film 243A2 (optical conversion film) attached to the light-irradiation side of the substrate 243A1 with the polarization axis in a predetermined direction. The substrate 243A1 is configured in the same manner as the above-described substrate 242A. The polarization film 243A2 is substantially the same as the above-described polarization film 242B except that the direction of the polarization axis is different.

The second irradiation-side polarization plate 243B, just like the first irradiation-side polarization plate 243A, includes a substrate 243B1 (transparent member) and a polarization film 243B2 (optical conversion film). The substrate 243B1 is configured in the same manner as the above-described substrate 243A1. The polarization film 243B2 is substantially the same as the above-described polarization film 243A2 except in the light absorption property.

The irradiation-side retaining plate 246 supports and fixes the first irradiation-side polarization plate 243A and the second irradiation-side polarization plate 243B so that the polarization axis of the polarization film 243A2 of the first irradiation-side polarization plate 243A and that of the polarization film 243B2 of the second irradiation-side polarization plate 243B are parallel to each other. The irradiation-side retaining plate 246, just like the incident-side retaining plate 245, is formed in a substantially rectangular shape by means of sheet metal processing over an aluminum plate. The irradiation-side retaining plate 246, as shown in FIG. 8, includes a plate member 246A and protrusions 246B protruding from the plate member 246A toward the light-irradiation side.

The plate member 246A has cutouts 246A1 (pin spacer insertion portion) formed by cutting etc. on four corners thereof so that the pin spacers 24E can be inserted. The upper and lower ends of the plate member 246A serve as bonding portions 246A2, of which light-irradiation face is bonded and fixed to a lateral face of a base 247.

The plate member 246A also has an opening 246A3 formed by cutting etc, at the approximate center thereof to allow the transmission of the light beam irradiated from the optical modulator 24A (FIG. 7).

Two protrusions 246B are formed on each of the vicinities of the upper and lower edges of the opening 246A3 of the plate member 246A. The protrusion 246B, which is formed by cutting and folding the plate member 246A, protrudes toward the light-irradiation side and has the tip portion bent toward the approximate center in the horizontal direction to form an L-shaped cross-section.

The second irradiation-side polarization plate 243B is bonded and fixed to the light-irradiation face of the four protrusions 246B of the irradiation-side retaining plate 246 in a manner that the polarization film 243B2 is positioned at the light-irradiation side. The periphery of the opening 246A3 of the plate member 246A defines a support portion 246A4, on the light-irradiation face of which the first irradiation-side polarization plate 243A is bonded and fixed in a manner that the polarization film 243A2 is positioned at the light-irradiation side. Thus, the first irradiation-side polarization plate 243A and the second irradiation-side polarization plate 243B are arranged to oppose to each other, and the polarization axes of the polarization films 243A2 and 243B2 are parallel to each other.

[3-4] Structure of Prism Unit 24D

Referring to FIG. 7, the prism unit 24D includes the cross dichroic prism 244 and the base 247 fixed to the upper and lower faces (a pair of faces orthogonal to the light-incident face) of the cross dichroic prism 244.

The cross dichroic prism 244 combines the optical image irradiated from the irradiation-side polarization plate 243 and modulated for each color light to form a color image. In the cross dichroic prism 244, a dielectric multi-layer film for reflecting the red light and a dielectric multi-layer film for reflecting the blue light are formed along the boundaries of four right-angle prisms substantially in an X-shape, the dielectric multi-layer films combining the three color lights.

The base 247, as shown in FIG. 7, includes an upper base 247A fixed to the upper face of the cross dichroic prism 244 and a lower base 247B fixed to the lower face of the cross dichroic prism 244.

The upper base 247A is shaped substantially in a rectangular solid having the periphery slightly larger than the cross dichroic prism 244, and the lateral faces thereof are protruded as compared to the lateral faces of the cross dichroic prism 244.

The upper base 247A has cutouts 247A1 on four corners thereof from the upper face to the lower face.

The upper base 247A also has regulating portions 247A2 at three lateral faces on which the respective optical modulators 24A are set. The regulating portions 247A2 shaped in a triangle (in plan view) extend from the respective lateral faces toward the lower base 247B. The thickness of the regulating portion 247A2 is substantially the same as the protruding length of the lateral face of the upper base 247A from the light-incident face of the cross dichroic prism 244. That is, when the upper base 247A is set on the cross dichroic prism 244, the regulating portions 247A2 abut on the light-incident face of the cross dichroic prism 244.

The lower base 247B, just like the upper base 247A, is shaped substantially in a rectangular solid having the periphery slightly larger than that of the cross dichroic prism 244, and the lateral faces thereof are protruded as compared to the lateral faces of the cross dichroic prism 244.

The lower base 247B has four holes 247B1 near the four faces. The holes 247B1 penetrating the upper and lower faces allows the cooling air blown from the cooling unit (not shown) to flow between the cross dichroic prism 244 and the irradiation-side polarization unit 24C.

The lower base 247B has attachments 247B2 extending outward from four corners thereof for fixing the optical device 24 to the mount face 262 of the head 26. When the optical device 24 is fixed to the mount face 262 of the head 26, the positions of the four holes 247B1 of the lower base 247B match the positions of the four cutouts 262A of the mount face 262 of the head 26.

The upper base 247A and the lower base 247B are made of magnesium alloy. However, the material for the upper base 247A and the lower base 247B is not limited to magnesium alloy. They may be made of lightweight material with a good heat conductivity, for instance, Al, Mg, Ti, or alloy thereof, metal such as iron-nickel alloy (Invar and 42Ni—Fe etc.), carbon steel, brass, stainless or the like, or resin with a carbon filler such as carbon fiber and carbon nanotube added thereto (polycarbonate, poly phenylene sulfide, liquid crystal resin etc.).

[3-5] Structure of Pin Spacer 24E

Figure 9:
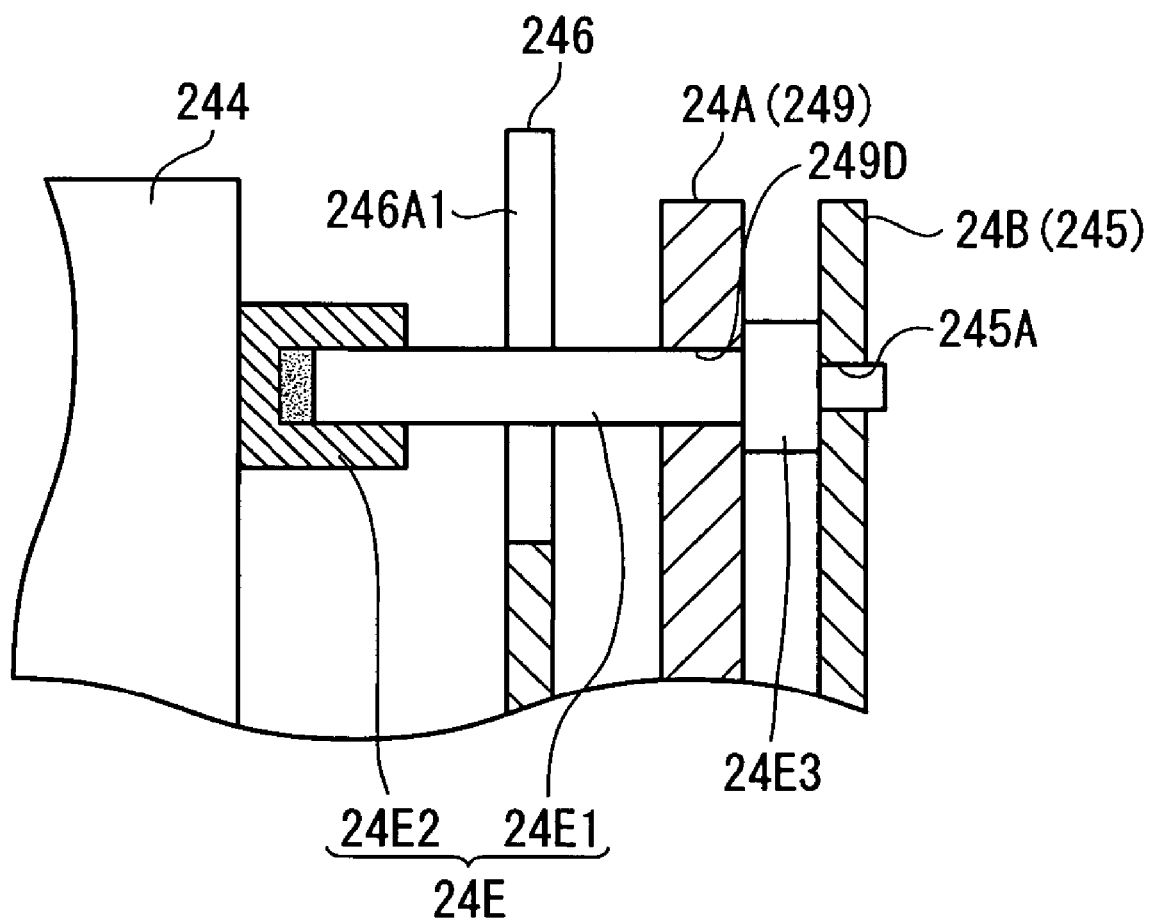
FIG. 9 is a cross-section showing a pin spacer according to the aforesaid embodiment.

FIG. 9 is a cross-section showing a structure of the pin spacer 24E.

As shown in FIG. 7 or FIG. 9, the pin spacer 24E includes a spacer body 24E1 inserted into the hole 245A of the incident-side retaining plate 245 and the hole 249D of the holder frame 249 and a spacer socket 24E2 that is fixed to the light-incident face of the cross dichroic prism 244 and fits to one end (first end) of the spacer body 24E1.

The spacer body 24E1 is a substantially cylindrical member and is made of ultraviolet-ray transmittable synthetic resin (acrylic material) having the heat-insulation property.

In the spacer body 24E1, a step-like thick portion 24E3 having a larger diameter is formed near the end (second end) opposite to the first end fitted into the spacer socket 24E2.

The light-irradiation face of the incident-side retaining plate 245 and the light-incident face of the holder frame 249 respectively abut on both ends of the thick portion 24E3.

The spacer socket 24E2 is a cylindrical member having a bottom face and is made of ultraviolet-ray transmittable synthetic resin (acrylic material). The spacer socket 24E2 is so configured that the first end of the spacer body 24E1 is loosely fitted thereinto.

The spacer body 24E1 and the spacer socket 24E2 may be made of ultraviolet-ray transmittable material having the heat-insulation property, e.g., other synthetic resin, glass or the like, without limiting to the acrylic material. The number of the pin spacer 24E is not limited to four but may be two or more. In that case, the number of the hole 245A of the incident-side retaining plate 245 and the hole 249D of the holder frame 249 may be formed to correspond to the number the pin spacer 24E.

Figure 10:
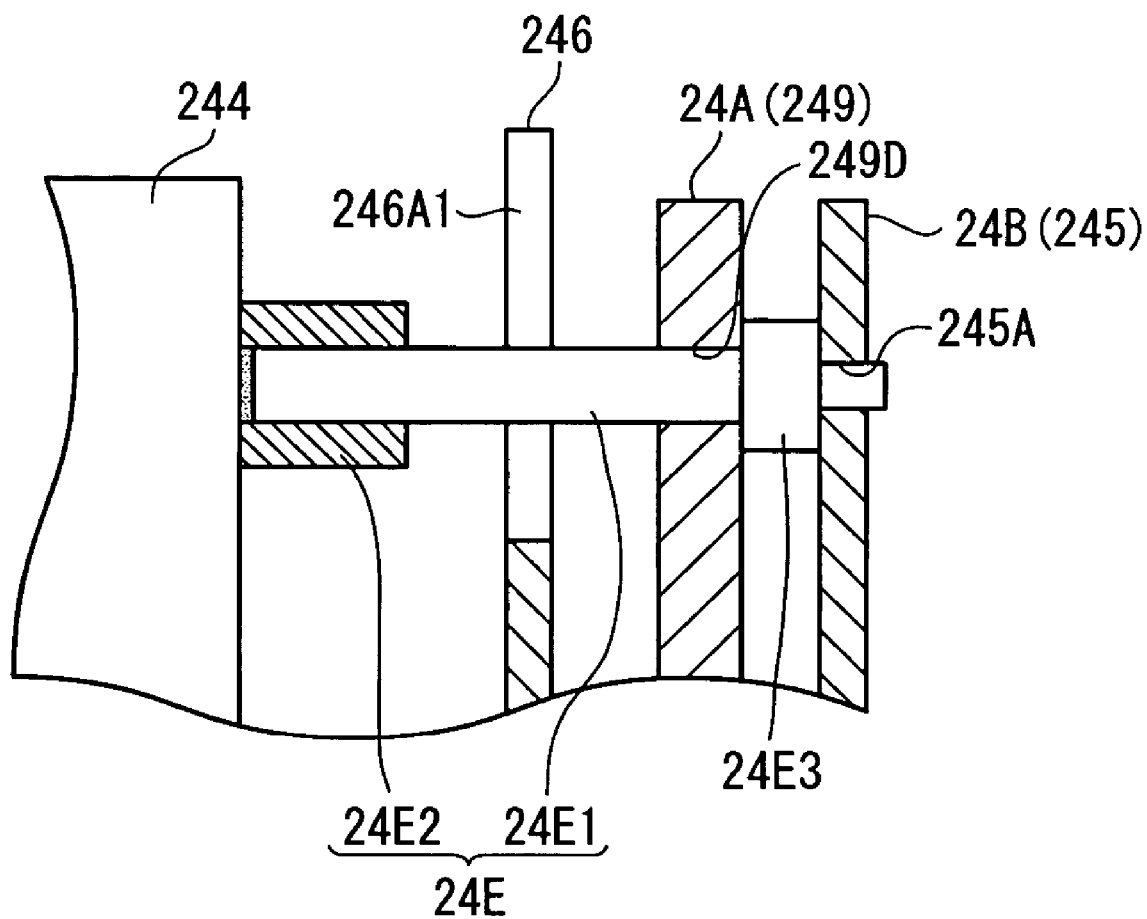
FIG. 10 is an illustration showing a modification of the pin spacer.

The spacer socket 24E2 is not limited to the cylindrical member with a bottom face, but may have a cylindrical shape without a bottom face as shown in FIG. 10.

Figure 11:
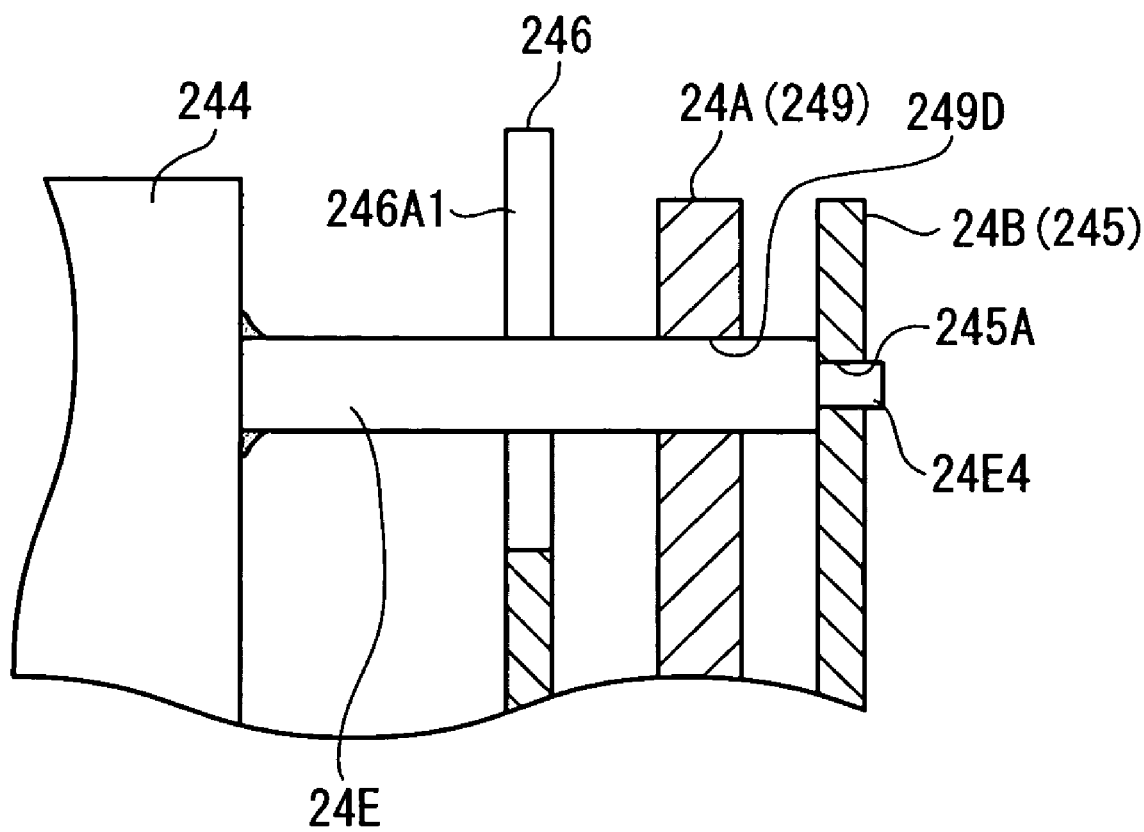
FIG. 11 is an illustration showing another modification of the pin spacer.

Although the pin spacer 24E is composed of two members, i.e., the spacer body 24E1 and the spacer socket 24E2, it may be composed of one member. For instance, a pin spacer 24E shown in FIG. 11 has a substantially equal diameter through one end (first end) to the other end (second end), and a step-like thin portion 24E4 having a smaller diameter is formed on the second end. The first end thereof is directly fixed to the light-incident face of the cross dichroic prism 244 while the thin portion 24E4 of the second end is fitted and fixed to the hole 245A of the incident-side polarization unit 24B. The holder frame 249 of the optical modulator 24A abuts on the circumference of the pin spacer 24E.

[4] Manufacturing Method of Optical Device 24

The above-described optical device 24 is assembled with following steps.

(A) Firstly, the optical modulator 24A, the incident-side polarization unit 24B, the irradiation-side polarization unit 24C and the prism unit 24D are assembled as described below.

(A-1) Each of the liquid crystal panels 241R, 241G and 241B is housed in the housing 249A of the holder frame 249. Then the support plate 249B of the holder frame 249 is installed from the liquid crystal panel insertion side of the housing 249A to press and fix each of the liquid crystal panels 241R, 241G and 241B, so that the optical modulator 24A is assembled.

(A-2) The incident-side polarization plate 242 is fixed to the periphery of the opening (not shown) on the light-incident face of the incident-side retaining plate 245 with the use of the adhesive, so that the incident-side polarization unit 24B is assembled.

(A-3) The first irradiation-side polarization plate 243A is fixed to the light-irradiation face of the support portion 246A4 of the plate member 246A of the irradiation-side retaining plate 246 with the use of the adhesive. The second irradiation-side polarization plate 243B is fixed to the light-irradiation face of the protrusions 246B of the irradiation-side retaining plate 246 with the use of the adhesive, so that the irradiation-side polarization unit 24C is assembled.

(A-4) The base 247 is fixed to the upper and lower faces of the cross dichroic prism 244 with the use of the adhesive, so that the prism unit 24D is assembled.

(B) Next, the light-irradiation face of the bonding portion 246A2 of the irradiation-side retaining plate 246 of the irradiation-side polarization unit 24C is fixed to the lateral face of the base 247 of the prism unit 24D with the use of the adhesive.

(C) Then the ultraviolet curable adhesive is applied on both faces of the thick portions 24E3 of the spacer bodies 24E1. The second ends of the spacer bodies 24E1 are inserted into the holes 245A of the incident-side retaining plate 245 of the incident-side polarization unit 24B, so that the thick portions 24E3 of the spacer bodies 24E1 abut on the light-irradiation face of the incident-side retaining plate 245. Then, the ultraviolet ray is irradiated to cure the ultraviolet curable adhesive interposed between the thick portions 24E3 of the spacer bodies 24E1 and the incident-side polarization unit 24B, so that the spacer bodies 24E1 and the incident-side polarization unit 24B are fixed.

(D) The first ends of the spacer bodies 24E1 are inserted into the holes 249D of the holder frame 249 of the optical modulator 24A, so that the thick portions 24E3 of the spacer bodies 24E1 abut on the light-incident face of the optical modulator 24A. Then, the ultraviolet ray is irradiated to cure the ultraviolet curable adhesive interposed between the thick portions 24E3 of the spacer bodies 24E1 and the optical modulator 24A, so that the spacer bodies 24E1 and the optical modulator 24A are fixed.

In the above steps (C) and (D), the spacer bodies 24E1, the optical modulator 24A and the incident-side polarization unit 24B are fixed in contact with the thick portions 24E3. Therefore, for instance, even in the case that the thickness of the holder frame 249 of the optical modulator 24A and the thickness of the incident-side retaining plate 245 of the incident-side polarization unit 24B are small, the optical modulator 24A and the incident-side polarization unit 24B can be surely fixed to the spacer bodies 24E I.

(E) Next, the ultraviolet curable adhesive is applied to the first ends of the spacer bodies 24E1 to which the optical modulator 24A and the incident-side polarization unit 24B are fixed in the steps (C) and (D), and the first ends of the spacer bodies 24E1 are loosely fitted into the spacer sockets 24E2 of the spacer bodies 24E1. Then, in the integrated optical modulator 24A, incident-side polarization unit 24B and the pin spacers 24E, the spacer sockets 24E2 of the pin spacers 24E are attached to the light-incident face of the cross dichroic prism 244 of the prism unit 24D with the use of the ultraviolet curable adhesive.

(F) While the ultraviolet curable adhesive between the spacer sockets 24E2 and the light-incident face of the cross dichroic prism 244 and the ultraviolet curable adhesive between the spacer sockets 24E2 and the spacer bodies 24E1 are not yet cured, the positions of the respective liquid crystal panels 241R, 241G and 241B are adjusted.

(G) After adjusting the positions of the respective liquid crystal panels 241R, 241G and 241B, the ultraviolet curable adhesive is cured to fix the positions.

With the above steps, the optical device 24 is produced.

The position adjustment of the respective liquid crystal panels 241R, 241G and 241B in the above steps (F) and (G) is performed in a following manner, for instance.

Firstly, as for the liquid crystal panel 241G facing the front of the projection lens 3 (FIGS. 1 and 2), a joint face between the light-incident face of the cross dichroic prism 244 and the spacer sockets 24E2 is used as a slide face to adjust the alignment, and joint sections between the spacer sockets 24E2 and the spacer bodies 24E1 are used as slide faces, i.e., the spacer bodies 24E1 are slid relative to the spacer sockets 24E2 to adjust the focus. The alignment adjustment indicates the adjustment of an X axis direction, a Y axis direction and a rotation direction (θ direction) of an XY plane, wherein the optical axis direction of the projection lens 3 is defined as a Z direction, and two axes orthogonal thereto are defined as X and Y axes. The focus adjustment indicates the adjustment of a Z axis direction, a rotation direction (X θ direction) around the X axis and a rotation direction (Y θ direction) around the Y axis.

Once the liquid crystal panel 241G is adjusted to a predetermined position, the ultraviolet ray is irradiated from the light-incident side of the incident-side polarization unit 24B toward the holes 245A of the incident-side retaining plate 245. The irradiated ultraviolet ray passes the pin spacers 24E through to cure the ultraviolet curable adhesive interposed between the spacer sockets 24E2 and the spacer bodies 24E1 and the ultraviolet curable adhesive interposed between the spacer sockets 24E2 and the light-incident face of the cross dichroic prism 244.

Then, referring to the liquid crystal panel 241G of which position has been adjusted and fixed, the positions of the liquid crystal panels 241R and 241B are fixed and adjusted in the same manner described above.

Note that there is no necessity to follow the above order to assemble the optical device 24.

The thus assembled optical device 24 is mounted and fixed on the mount face 262 of the head 26 by fixing the attachments 247B2 of the lower base 247B with screws etc.

[5] Cooling Structure of Optical Device 24

The following description is a cooling structure of the optical device 24 fixed to the light guide 25 thought the head 26. The description is mainly based on the cooling structure of the irradiation-side polarization unit 24C of the optical device 24.

Figure 12:
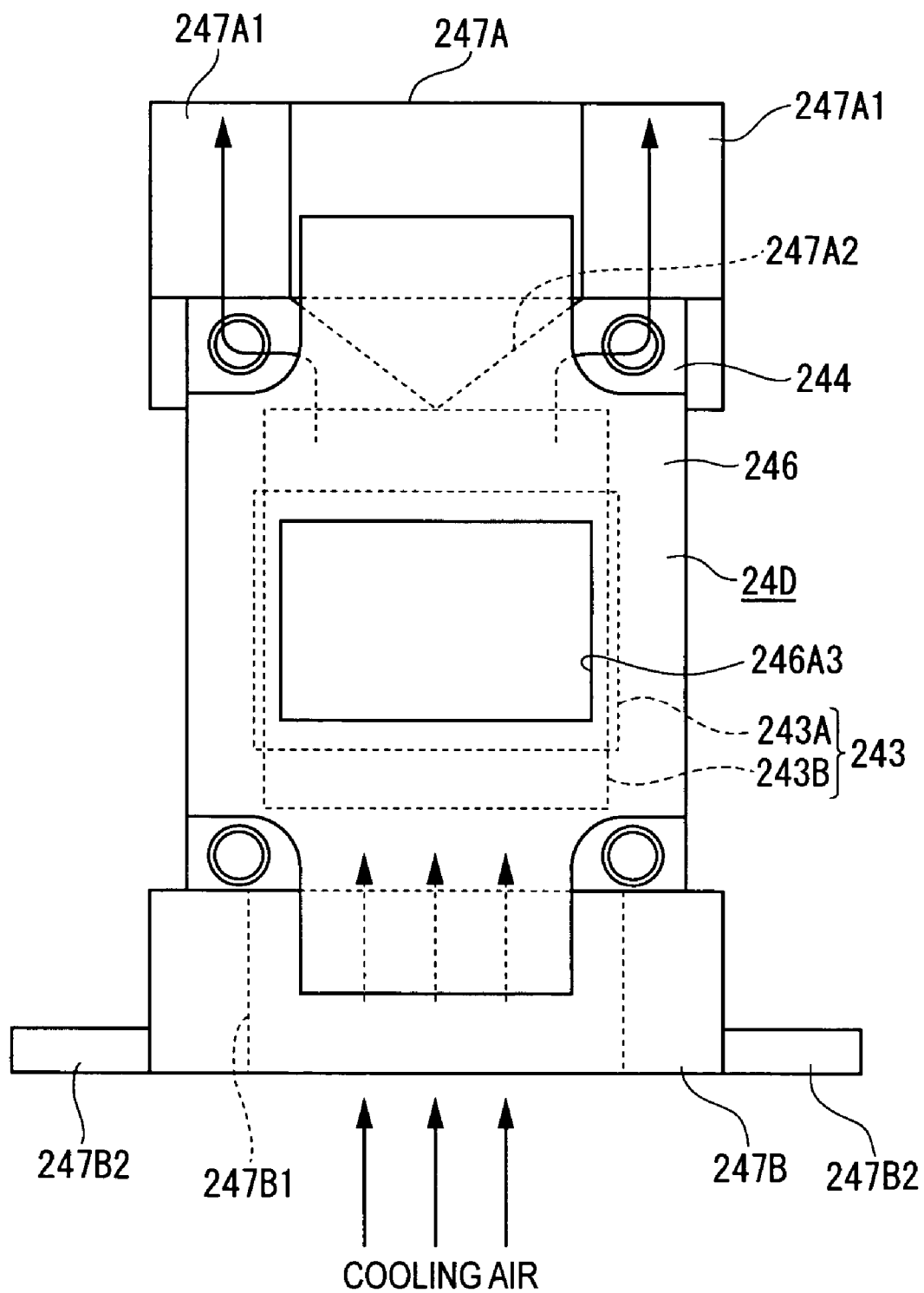
FIG. 12 is an illustration showing a cooling structure of the irradiation-side polarization unit according to the aforesaid embodiment.

FIG. 12 is an illustration showing the cooling structure of the irradiation-side polarization unit 24C. Although FIG. 12 shows the cooling structure of the irradiation-side polarization unit 24C arranged on the side of the liquid crystal pane 241R out of three irradiation-side polarization units 24C, other irradiation-side polarization units 24C also have the same cooling structure.

The cooling air blown from the cooling unit (not shown) is guided into the optical unit 2 through the four cutouts 262A formed on the mount face 262 of the head 26.

As shown in FIG. 12, a part of the cooling air guided into the optical unit 2 through the four cutouts 262A flows between the cross dichroic prism 244 and the irradiation-side polarization unit 24C through the holes 247B1 formed on the lower base 247B of the optical device 24. The flowing cooling air cools the both faces of the second irradiation-side polarization plate 243B bonded and fixed to the protrusions 246B of the irradiation-side retaining plate 246 of the irradiation-side polarization unit 24C as well as the light-irradiation face of the first irradiation-side polarization plate 243A bonded and fixed to the support portion 246A4.

After cooling the irradiation-side polarization plate 243, the air flows upward while divided into the left and right by the regulating portions 247A2 formed on the upper base 247A. Then the air passes the upper side of the optical device 24 thought the cutouts 247A1 formed on the upper base 247A and flows to the outside of the optical unit 2 (FIG. 1).

Although not specifically shown, the remaining air guided into the optical unit 2 through the four cutouts 262A flows from the lower side to the upper side of the incident-side polarization unit 24B, the optical modulator 24A and the irradiation-side polarization unit 24C at the light-incident side of the irradiation-side polarization unit 24C to cool the incident-side polarization unit 24B and the optical modulator 24A while cooling the irradiation-side polarization unit 24C from the light-incident side. After cooling the incident-side polarization unit 24B, the optical modulator 24A and the irradiation-side polarization unit 24C, the air passes the upper side of the optical device 24 and flows to the outside of the optical unit 2 (FIG. 1).

[Advantages of First Embodiment]

According to the above-described first embodiment, following advantages can be obtained.

(1) The irradiation-side polarization unit 24C of the optical device 24 includes the irradiation-side polarization plate 243 and the irradiation-side retaining plate 246 made of aluminum. The irradiation-side polarization plate 243 includes the first irradiation-side polarization plate 243A and the second irradiation-side polarization plate 243B respectively having the substrates 243A1 and 243B1, and the polarization films 243A2 and 243B2. The irradiation-side retaining plate 246 supports and fixes the irradiation-side polarization plate 243, and is fixed to the lateral face of the base 247 made of magnesium alloy. Accordingly, the heat generated at the polarization films 243A2 and 243B2 due to the irradiation of the light from the light source device 211 can be transferred and radiated through a heat-conduction path from the substrates 243A1, 243B1 to the irradiation-side retaining plate 246 to the base 247.

(2) The optical device 24 is mounted and fixed on the head 26 made of magnesium alloy through the attachments 247B2 of the lower base 247B of the base 247. The head 26 is fixed to the light guide 25 made of aluminum. Accordingly, the heat transferred through the path from the substrates 243A1, 243B1 to the irradiation-side retaining plate 246 to the base 247 is further conducted from the head 26 to the light guide 25. Therefore, the heat does not stay in the optical device 24, thereby enhancing the heat radiation property of the optical device 24.

(3) The irradiation-side polarization plate 243 is supported and fixed by the irradiation-side retaining plate 246. Accordingly, comparing with a configuration in which the irradiation-side polarization plate 243 is directly fixed to the lateral face of the base 247, the size of the substrates 243A1 and 243B1 can be reduced to the minimum necessary size, thereby avoiding the cost increase of the optical device 24 due to the size increase of the substrates 243A1 and 243B1.

(4) Since the irradiation-side retaining plate 246 has cutouts 246A (translator's comment: 246A1), the optical modulator 24A is fixed to the light-incident face of the cross dichroic prism 244 through the pin spacers 24E. Accordingly, comparing with a configuration in which the optical modulator 24A is fixed to the light-incident face of the irradiation-side retaining plate 246 through the pin spacers 24E, the displacement of the optical modulator 24A is evitable even when the heat generated at the irradiation-side polarization plate 243 causes a change in the size (expansion, contraction) of the irradiation-side retaining plate 246. This prevents a change in the relative position of the liquid crystal panels 241R, 241G and 241B, thereby avoiding the pixel displacement in the optical image formed by the optical device 24.

(5) Since the irradiation-side retaining plate 246 includes the plate member 246A and the protrusions 246B, it can support and fix both of the first irradiation-side polarization plate 243A and the second irradiation-side polarization plate 243B of the irradiation-side polarization plate 243. Further, since the first irradiation-side polarization plate 243A and the second irradiation-side polarization plate 243B are supported and fixed at different positions in an out-of-plane direction by the plate member 246A and the protrusions 246B of the irradiation-side retaining plate 246, an air passage is formed between the first irradiation-side polarization plate 243A and the second irradiation-side polarization plate 243B. This enhances the heat radiation property of the first irradiation-side polarization plate 243A and the second irradiation-side polarization plate 243B.

(6) Since the protrusions 246B are formed to protrude from the plate member 246A toward the light-irradiation side, the protrusions 246B and the second irradiation-side polarization plate 243B to be bonded and fixed to the protrusions 246B are arranged between the plate member 246A and the cross dichroic prism 244. The first irradiation-side polarization plate 243A is bonded and fixed to the light-irradiation side of the plate member 246A. Accordingly, without increasing the size of the optical device 24, the irradiation-side retaining plate 246 can support a pair of first irradiation-side polarization plate 243A and the second irradiation-side polarization plate 243B. Further, mechanical interferences between other components of the optical modulator 24A and the first irradiation-side polarization plate 243A or the second irradiation-side polarization plate 243B can be avoided, thereby assuring a functional reliability of the irradiation-side polarization plate 243.

(7) The plate member 246A of the irradiation-side retaining plate 246 has the bonding portions 246A2 and the support portion 246A4. Since the bonding portions 246A2 and the support portion 246A4 are flush with each other, the irradiation-side retaining plate 246 is easily producible, thereby contributing to the reduction of the production cost of the optical device 24.

(8) Since the irradiation-side retaining plate 246 is formed by means of sheet metal processing over a metal plate of aluminum or the like, the production of the irradiation-side retaining plate 246 is further facilitated, thereby further contributing to the reduction of the production cost of the optical device 24.

(9) Since the lower base 247B of the base 247 has holes 247B1 for circulating the cooling air, the cooling air can be blown between the cross dichroic prism 244 and the irradiation-side polarization unit 24C through the holes 247B1, thereby further enhancing the heat radiation property of the irradiation-side polarization plate 243.

(10) Since the upper base 247A of the base 247 has the cutouts 247A1 and the regulating portions 247A2, the fresh cooling air can be always circulated preventing the cooling air flown among the cross dichroic prism 244, the irradiation-side polarization plate 243 and the irradiation-side retaining plate 246 from staying therein. This further improves the heat radiation property of the irradiation-side polarization plate 243.

(11) Since the irradiation-side polarization plate 243 includes the first irradiation-side polarization plate 243A and the second irradiation-side polarization plate 243B, the heat of the light beam absorbed in the irradiation-side polarization plate 243 can be dispersed, thereby reducing the heat absorbed by the respective polarization plates 243A and 243B. This protects the irradiation-side polarization plate 243 from the thermal deterioration, thus contributing to improve the resistance and to assure the functional reliability.

(12) The incident-side polarization unit 24B, just like the irradiation-side polarization unit 24C, includes the incident-side polarization plate 242 and the incident-side retaining plate 245. The incident-side retaining plate 245, just like the irradiation-side retaining plate 246, is formed by means of sheet metal processing over an aluminum plate. Accordingly, the low-cost incident-side retaining plate 245 can radiates the heat generated at the incident-side polarization plate 242.

(13) The lower light guide 251 and the upper light guide 252 of the light guide 25, just like the incident-side retaining plate 245 and the irradiation-side retaining plate 246, are formed by means of sheet metal processing over an aluminum plate. Accordingly, the production cost of the optical device 24 and the light guide 25 can be reduced, and consequently, the production cost of the optical unit 2 can be reduced.

(14) Since the projector 1 includes the above-described low-cost optical device 24, the production cost of the projector 1 can be also reduced. Also, since the projector 1 includes the above-described optical device 24 having a good cooling efficiency, it can project a high-quality optical image with no pixel displacement on a screen. Since the luminance of the light beam irradiated from the light source device 211 can be set at a high level, a clear optical image can be projected on the screen. Furhter, there is no need to enhance the cooling function of a fan and the like of the cooling unit, thus contributing to the reduction in power consumption, noise and size of the projector 1.

(15) Since the incident-side polarization unit 24B is attached to the optical device 24, the lower light guide 251 need not have a portion for holding the incident-side polarization unit 24B, thus reducing the production cost.

(16) Since the incident-side polarization unit 24B is attached to the optical device 24, a manufacturing apparatus for manufacturing the optical device 24 need not have a portion on which the incident-side polarization unit 24B is placed, thus simplifying the manufacturing apparatus.

(17) Since the pin spacers 24E are made of acrylic material having the heat-insulation property, the heat conduction between the cross dichroic prism 244 and the holder frame 249 can be blocked on a heat-conduction path from the irradiation-side retaining plate 246 to the base 247 to the cross dichroic prism 244 to the pin spacers 24E to the holder frame 249. Also, just like the above, on a heat-conduction path from the holder frame 249 to the pin spacers 24E to the incident-side retaining plate 245, the heat conduction between the holder frame 249 and the incident-side retaining plate 245 can be blocked. With this configuration, the irradiation-side polarization plate 243, the liquid crystal panels 241R, 241G and 241B and the incident-side polarization plate 242 can be independent without conducting the heat to each other through the pin spacers 24E. Accordingly, the cooling air blown to the optical device 24 can separately and efficiently cool the irradiation-side polarization plate 243, the liquid crystal panels 241R, 241G and 241B and the incident-side polarization plate 242.

Even when the circumferential face of the pin spacer 24E is in contact with the edge of the cutout 246A1 of the irradiation-side retaining plate 246, the thermal interference among the irradiation-side polarization plate 243, the liquid crystal panels 241R, 241G and 241B and the incident-side polarization plate 242 is avoidable in the manner same as the above.

[Second Embodiment]

Next, a second embodiment of the present invention will be described.

Figure 13:
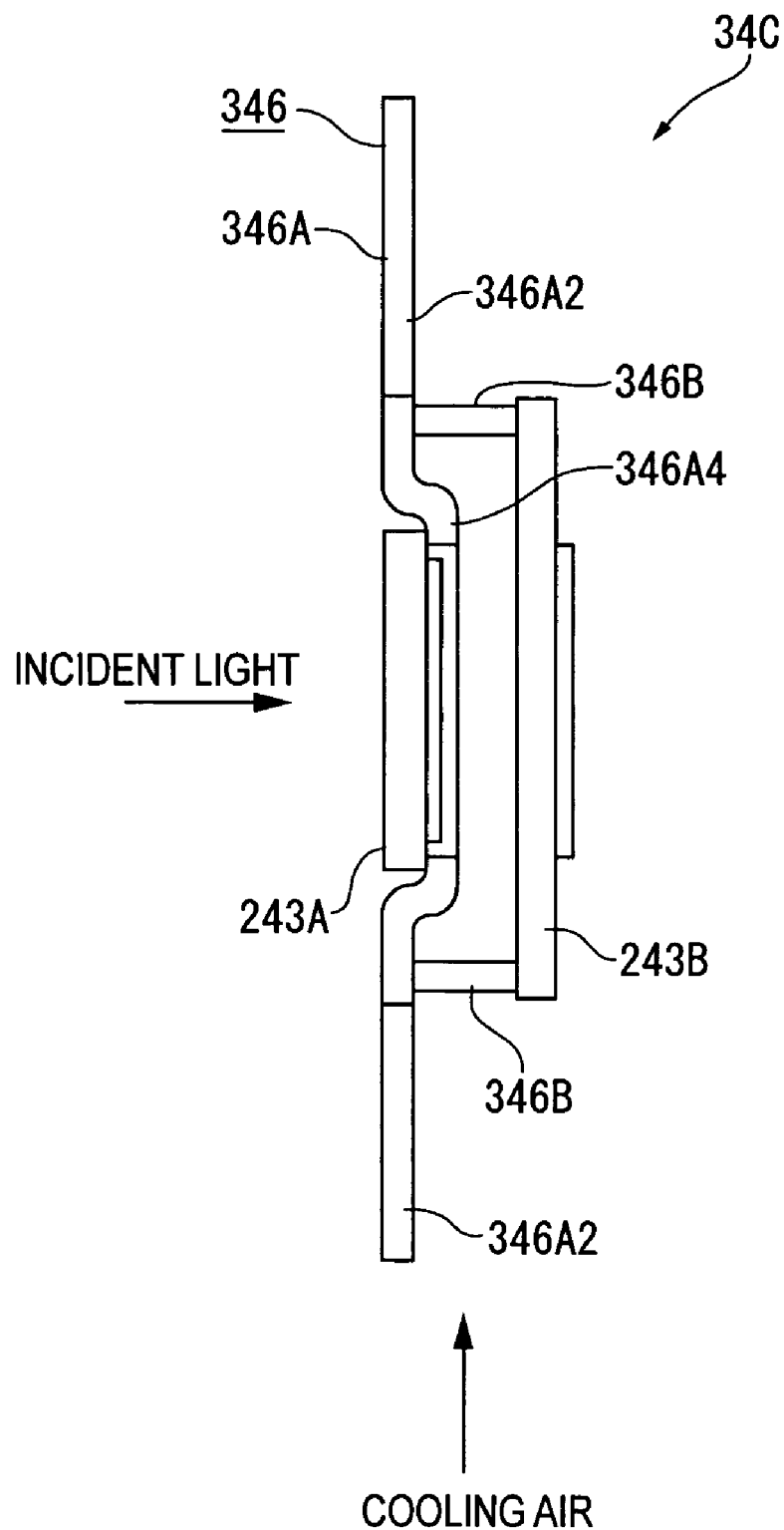
FIG. 13 is an illustration showing an irradiation-side polarization unit according to a second embodiment.

FIG. 13 is an illustration showing an irradiation-side polarization unit 34C according to the second embodiment.

In the following description, the components same as those in the first embodiment are indicated by the same reference symbols or numerals for omitting or simplifying the detailed description thereof.

According to the first embodiment, in the irradiation-side polarization unit 24C, the plate member 246A of the irradiation-side retaining plate 246 is so formed that the bonding portions 246A2 and the support portion 246A4 are flush with each other.

In contrast, according to the second embodiment, in the irradiation-side polarization unit 34C, a plate member 346A of an irradiation-side retaining plate 346 is so bent to have three areas in the vertical direction as shown in FIG. 13. Specifically, upper and lower areas serve as bonding portions 346A2 corresponding to the bonding portions 246A2 of the first embodiment. The area between the bonding portions 346A2, which is recessed relative to the bonding portions 346A2 toward the light-irradiation side (a protruding direction of protrusions 346B), serves as a support portion 346A4 corresponding to the support portion 246A4 of the first embodiment. The light-incident face of the support portion 346A4 supports and fixes the first irradiation-side polarization plate 243A.

The protrusions 346B of the irradiation-side retaining plate 346 can be formed in the same manner as the protrusions 246B of the first embodiment, and thus the description thereof will be omitted. The manufacturing method and the cooling structure of the optical device 24 are substantially the same as those of the first embodiment, and thus the description thereof will be omitted.

According to the second embodiment, the following advantages can be obtained in addition to the advantages same as the above (1) to (6) and (8) to (17).

(18) In the irradiation-side polarization unit 34C, the plate member 346A of the irradiation-side retaining plate 346 has the bonding portions 346A2 and the support portion 346A4 that is recessed relative to the bonding portions 346A2 toward the light-irradiation side. The first irradiation-side polarization plate 243A of the irradiation-side polarization plate 243 is supported and fixed on the light-incident face of the support portion 346A4. With this configuration, a relatively large clearance can be formed between the first irradiation-side polarization plate 243A supported and fixed by the support portion 346A4 and the second irradiation-side polarization plate 243B supported and fixed by the protrusions 346B. Accordingly, the volume of the cooling air flowing between the first irradiation-side polarization plate 243A and the second irradiation-side polarization plate 243B is increased, thereby further enhancing the heat radiation property of the first irradiation-side polarization plate 243A and the second irradiation-side polarization plate 243B.

[Third Embodiment]

Next, a third embodiment of the present invention will be described.

Figure 14:
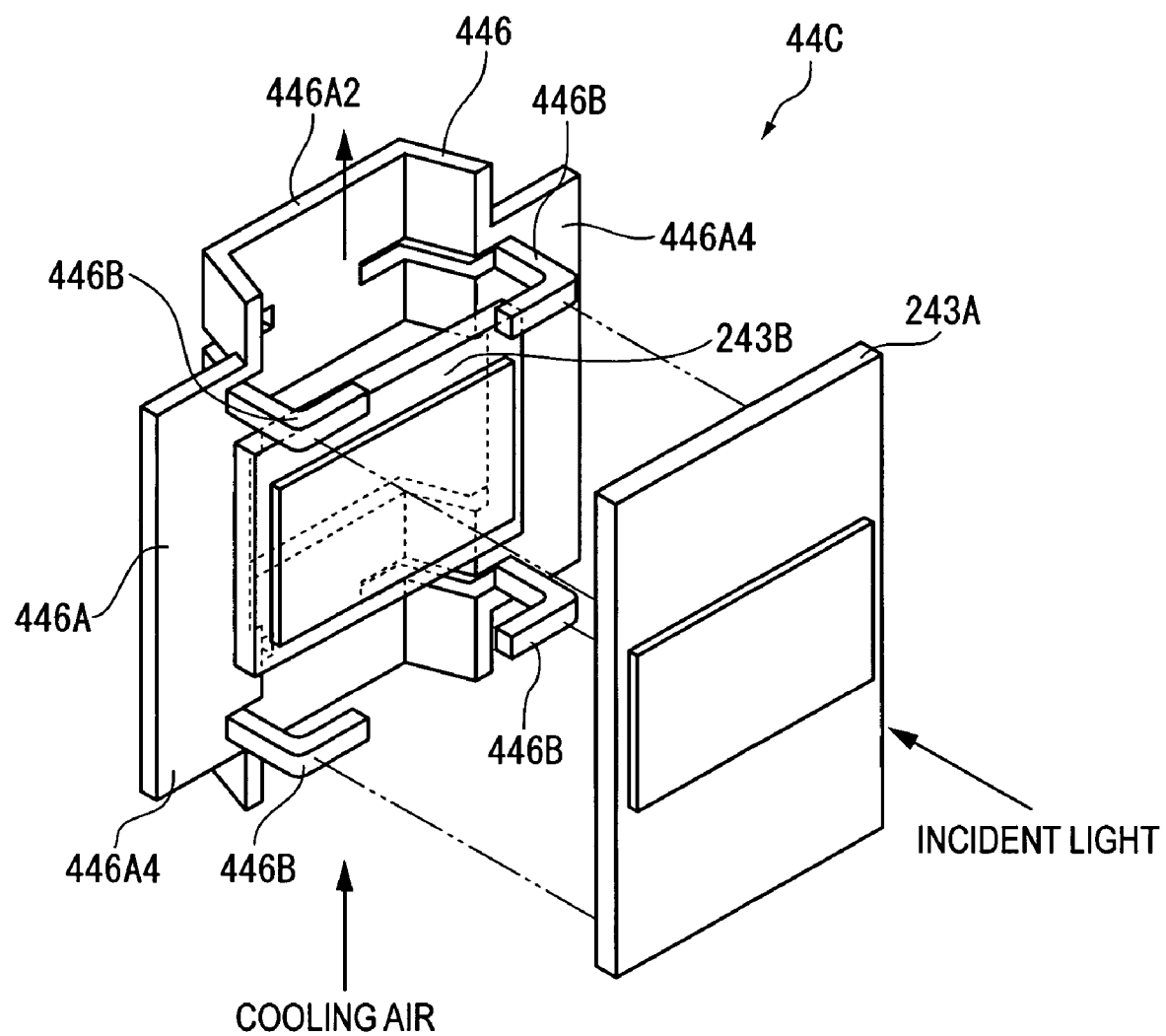
FIG. 14 is an illustration showing an irradiation-side polarization unit according to a third embodiment.

FIG. 14 is an illustration showing an irradiation-side polarization unit 44C according to the third embodiment.

In the following description, the components same as those in the first embodiment are indicated by the same reference symbols or numerals for omitting or simplifying the detailed description thereof.

According to the first embodiment, in the irradiation-side polarization unit 24C, the plate member 246A of the irradiation-side retaining plate 246 is so formed that the bonding portions 246A2 and the support portion 246A4 are flush with each other. The protrusions 246B of the irradiation-side retaining plate 246 protrude from the plate member 246A toward the light-irradiation side.

In contrast, according to the third embodiment, in the irradiation-side polarization unit 44C, a plate member 446A of an irradiation-side retaining plate 446 is so bent to have three areas in the horizontal direction as shown in FIG. 14. Specifically, right and left areas serve as support portions 446A4 corresponding to the support portion 246A4 of the first embodiment. The area between the support portions 446A4, which is recessed relative to the support portions 446A4 toward the light-irradiation side, serves as a bonding portion 446A2 corresponding to the bonding portions 246A2 of the first embodiment. The light-incident faces of the support portions 446A4 support and fix the second irradiation-side polarization plate 243B.

Protrusions 446B of the irradiation-side retaining plate 446 can be formed in the same manner as the protrusions 246B of the first embodiment, except that the protrusions 446B protrude from the plate member 446A toward the light-incident side. The light-incident faces of the protrusions 446B support and fix the first irradiation-side polarization plate 243A.

The manufacturing method and the cooling structure of the optical device 24 are substantially the same as those of the first embodiment, and thus the description thereof will be omitted.

According to the third embodiment, the following advantages can be obtained in addition to the advantages same as the above (1) to (5) and (8) to (17).

(19) In the irradiation-side polarization unit 44C, the plate member 446A of the irradiation-side retaining plate 446 has the bonding portion 446A2 and the support portions 446A4, the bonding portion 446A2 being recessed relative to the support portions 446A4 to be away from the protrusions 446B. The second irradiation-side polarization plate 243B of the irradiation-side polarization plate 243 is supported and fixed by the light-incident faces of the support portions 446A4. With this configuration, a relatively large clearance can be formed between the second irradiation-side polarization plate 243B supported and fixed by the plate member 446A and the light-incident face of the cross dichroic prism 244. Accordingly, the volume of the cooling air flowing between the irradiation-side polarization unit 44C and the cross dichroic prism 244 is increased, thereby further enhancing the heat radiation property of the second irradiation-side polarization plate 243B.

[Fourth Embodiment]

Next, a fourth embodiment of the present invention will be described.

Figure 15:
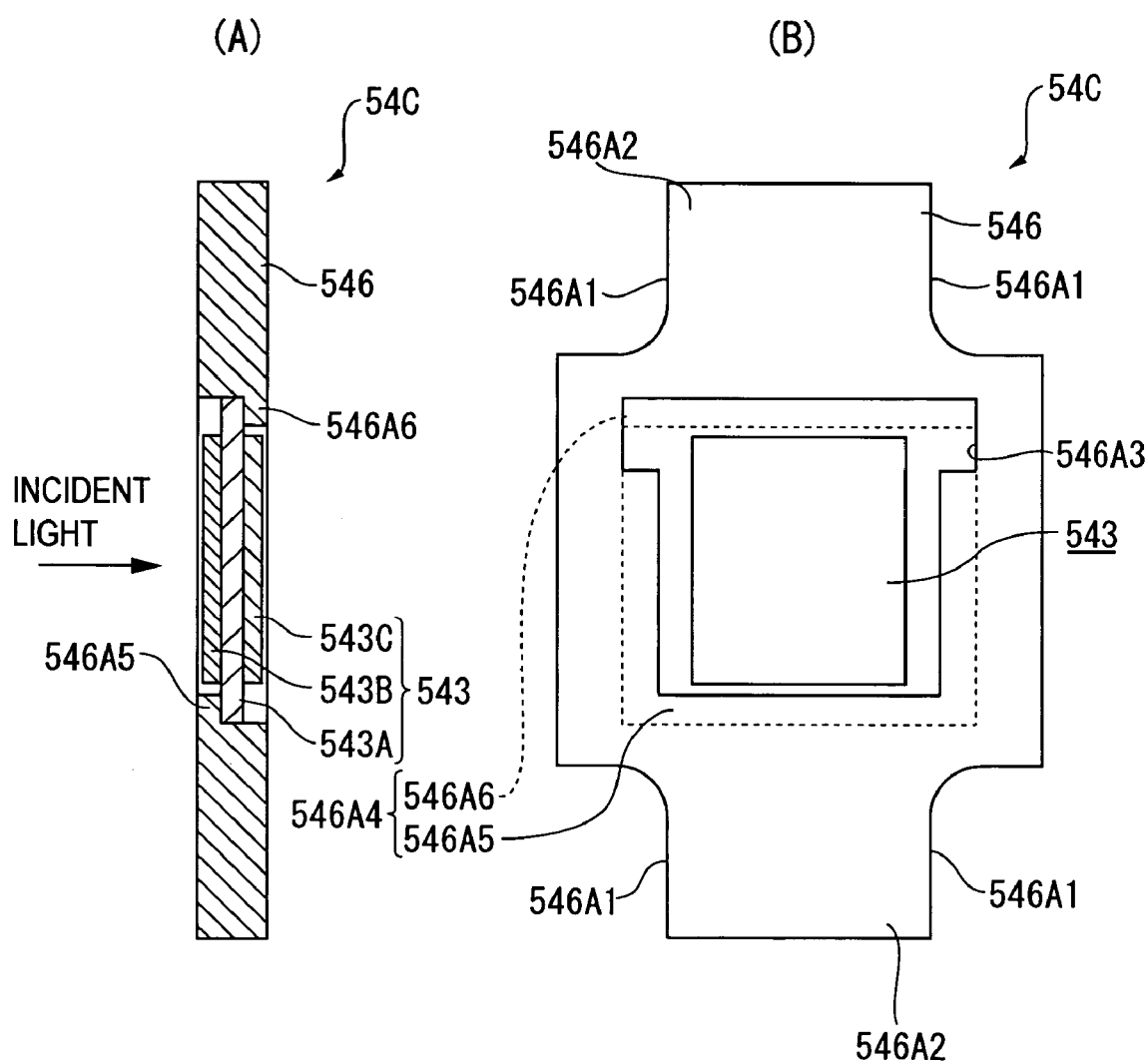
FIG. 15 is an illustration showing an irradiation-side polarization unit according to a fourth embodiment.

FIG. 15 is an illustration showing an irradiation-side polarization unit 54C according to the fourth embodiment. Specifically, FIG. 15(A) is a cross-section of the irradiation-side polarization unit 54C, and FIG. 15(B) is an illustration of the irradiation-side polarization unit 54C seen from the light-incident side.

In the following description, the components same as those in the first embodiment are indicated by the same reference symbols or numerals for omitting or simplifying the detailed description thereof.

According to the first embodiment, in the irradiation-side polarization unit 24C, the irradiation-side polarization plate 243 includes the first irradiation-side polarization plate 243A and the second irradiation-side polarization plate 243B. The irradiation-side retaining plate 246 supports and fixes only the light-incident face of the irradiation-side polarization plate 243.

In contrast, according to the fourth embodiment, in the irradiation-side polarization unit 54C, an irradiation-side polarization plate 543 includes a substrate 543A and polarization films 543B and 543C respectively attached to the light-incident face and the light-irradiation face of the substrate 543A as shown in FIG. 15(A). An irradiation-side retaining plate 546, as shown in FIG. 15(A), supports and fixes both of the light-irradiation face and the light-incident face of the irradiation-side polarization plate 543.

To be more specific, the irradiation-side polarization plate 543 includes the substrate 543A having the same configuration as the substrates 243A1 and 243B1 in the first embodiment, and the polarization films 543B and 543C having the same configuration as the polarization films 243A2 and 243B2 in the first embodiment attached to the light-incident face and the light-irradiation face of the substrate 543A. The polarization films 543B and 543C are so attached to have the polarization axes thereof in parallel to each other.

The irradiation-side retaining plate 546, which has substantially the same configuration as the irradiation-side retaining plate 246 in the first embodiment except that the protrusions 246B are not provided, is a substantially rectangular molding product of aluminum alloy etc.

The irradiation-side retaining plate 546 has cutouts 546A1 and an opening 546A3 respectively corresponding to the cutouts 246A1 and the opening 246A3 in the first embodiment. Bonding portions 546A2 shown in FIG. 15(B) correspond to the bonding portions 246A2 in the first embodiment.

In the irradiation-side retaining plate 546, as shown in FIG. 15, a support portion 546A4 corresponding to the support portion 246A4 in the first embodiment protrudes toward the inner side of the opening 546A3 and includes a first support face 546A5 for supporting and fixing the light-incident face of the irradiation-side polarization plate 543 and a second support face 546A6 for supporting and fixing the light-irradiation face of the irradiation-side polarization plate 543.

Referring to FIG. 15(A), the first support face 546A5 is formed to extend along the light-incident face of the irradiation-side retaining plate 546 and to be dented from the light-irradiation face of the irradiation-side retaining plate 546 toward the inner side of the thickness thereof. The first support face 546A5, as shown in FIG. 15(B), is formed to protrude from the left, right and lower edges of the opening 546A3 toward the inner side of the opening 546A3.

Referring back to FIG. 15(A), the second support face 546A6 is formed to extend along the light-irradiation face of the irradiation-side retaining plate 546 and to be dented from the light-incident face of the irradiation-side retaining plate 546 toward the inner side of the thickness thereof. The second support face 546A6, as shown in FIG. 15(B), is formed to protrude from the upper edge of the opening 546A3 toward the inner side of the opening 546A3.

In other words, the first support face 546A5 and the second support face 546A6 are so positioned to have no planar interference with each other.

As shown in FIG. 15, the second support face 546A6 of the irradiation-side retaining plate 546 is bonded and fixed to the upper end of the light-irradiation face of the irradiation-side polarization plate 543, while the first support face 546A5 of the irradiation-side retaining plate 546 is bonded and fixed to the left, right and lower ends of the light-incident face of the irradiation-side polarization plate 543.

The manufacturing method and the cooling structure of the optical device 24 are substantially the same as those of the first embodiment, and thus the description thereof will be omitted.

According to the fourth embodiment, the following advantages can be obtained in addition to the advantages same as the above (1) to (4) and (7) to (17).

(20) The irradiation-side polarization plate 543 includes the substrate 543A and the polarization films 543B and 543C respectively attached to the light-incident face and light-irradiation face of the substrate 543A. Accordingly, the number of the substrate 543A is reduced to the minimum necessary number, so that the production cost of the optical device 24 can be further reduced.

(21) The first support face 546A5 and the second support face 546A6 are formed on the periphery of the opening 546A3 of the irradiation-side retaining plate 546. Since the first support face 546A5 and the second support face 546A6 are so formed to have no planar interference with each other, they can support and fix both of the light-incident face and the light-irradiation face of the irradiation-side polarization plate 543. Therefore, the irradiation-side polarization plate 543 can be securely supported and fixed.

(22) Since the irradiation-side retaining plate 546 supports and fixes both of the light-incident face and the light-irradiation face of the irradiation-side polarization plate 543, a cooling air passage is formed flat, and thus having no interruption to the cooling air. Accordingly, the temperature distribution in the irradiation-side polarization plate 543 becomes uniform, thereby preventing a local overheat in the irradiation-side polarization plate 543. Therefore, the optical image formed by the optical device 24 can be kept clear.

[7] Modifications of Embodiments

The scope of the present invention is not limited to the above embodiments but includes following modifications as long as the object of the present invention can be achieved.

Although the lower light guide 251 and the upper light guide 252 of the light guide 25, the incident-side retaining plate 245, and the irradiation-side retaining plates 246, 346, 446 and 546 are made of aluminum in the above embodiments, they may be made of electrogalvanized steel plate or the like, or may be made of a molding product formed by means of injection molding etc. such as synthetic resin, iron-nickel alloy, Mg alloy, Al alloy.

Although the polarization film is depicted as the optical conversion film, it may be substituted by a phase film, a color correction film, a view angle correction film or the like.

Although the first irradiation-side polarization plate 243A and the second irradiation-side polarization plate 243B are used as the optical conversion plate in the first to third embodiments, they may be substituted by at least any two of a polarization plate, a phase plate, a color correction plate and a view angle compensation plate.

The spacer insertion portions are not limited to the cutouts 246A1 and 546A1 explained in the above embodiments. Specifically, as long as the spacer bodies 24E1 can be inserted, the cutouts may be substituted by holes formed on the irradiation-side retaining plates 246, 346, 446, and 546.

The polarization films 543B and 543C are used as the optical conversion films respectively attached to the light-incident face and the light-irradiation face of the substrate 543A of the irradiation-side polarization unit 54C in the fourth embodiment. However, without limiting thereto, for instance, at least any two of a polarization film, a phase film, a color correction film and a view angle compensation film may be used.

Although the base 247 includes the upper base 247A and the lower base 247B in the above embodiments, it may be composed of either the upper base 247A or the lower base 247B. The upper base 247A has the cutouts 247A1 and the regulating portions 247A2, and the lower base 247B has the holes 247B1. However, without limiting such configuration, the upper base 247A may be a rectangular solid without the cutouts 247A1 and the regulating portions 247A2, for instance. Further, the lower base 247B may not have holes 247B1, for instance.

In the first to third embodiments, the shape and the position to be arranged of the protrusions 246B, 346B and 446B of the irradiation-side retaining plate 246, 346 and 446 are not limited as long as they are shaped and positioned to be able to support and fix the first irradiation-side polarization plate 243A or the second irradiation-side polarization plate 243B.

The support portions 346A4 and 446A4 of the irradiation-side retaining plate 346 and 446 are recessed relative to the bonding portions 346A2 and 446A2 toward the protruding direction of the protrusions 346B and 446B in the second and third embodiments. However, without limiting such configuration, for instance, the support portions 346A4, 446A4 may be recessed relative to the bonding portions 346A2 and 446A2 toward the direction opposite to the protruding direction of the protrusions 346B and 446B. With this configuration, a sufficient clearance can be formed between the first irradiation-side polarization plate 243A and the second irradiation-side polarization plate 243B, thus further enhancing the cooling efficiency of the irradiation-side polarization plate 243.

In the above embodiments, a light-shielding film may be provided on the light-irradiation face of the incident-side retaining plate 245, the light-irradiation face of the holder frame 249 of the optical modulator 24A, and the light-irradiation face of the irradiation-side retaining plate 246. With this configuration, the light reflected from the cross dichroic prism 244 will not be reflected toward the cross dichroic prism 244 again, and thus preventing the deterioration of the contrast due to the stray light.

In the above embodiments, the shape and configuration of the light guide 25 are not limited to the above shape and configuration. For example, although the light guide 25 includes the solid positioning member 253 so that the optical components 212 to 215, 221 to 223 and 231 to 234 are fixed in the light guide 25 together with the positioning member 253 in the above description, the positioning member may be, for example, a fluid member. For instance, a photocurable adhesive, a thermosetting adhesive or the like may be used as the fluid positioning member. And, for instance, portions abutting on the optical components 212 to 215, 221 to 223 and 231 to 234 are formed on the component housing 251B of the lower light guide 251 or the upper light guide 252. Then, these abutting portions with the photocurable adhesive or the thermosetting adhesive applied abut on the optical components 212 to 215, 221 to 223 and 231 to 234, and the positions of the optical components 212 to 215, 221 to 223 and 231 to 234 are adjusted with the use of a separately provided optical axis adjusting jig. The optical components 212 to 215, 221 to 223 and 231 to 234 are positioned at predetermined positions with the surface tension of the photodurable adhesive or the thermosetting adhesive. After that, the optical components 212 to 215, 221 to 223 and 231 to 234 are fixed in the light guide 25 by curing the photocurable adhesive or the thermosetteing adhesive. With this configuration, the optical components 212 to 215, 221 to 223 and 231 to 234 are housed in the light guide 25 without the solid positioning member 253, so that the weight of the optical unit 2 can be reduced.

Although the ultraviolet curable adhesive is used for fixing the positions of the optical components 212 to 215, 221 to 223 and 231 to 234 and for fixing the positions of the optical modulator 24A, the incident-side polarization unit 24B and the irradiation-side polarization unit 24C relative to the prism unit 24D in the above embodiments, the thermosetting adhesive may be used. In that case, for fixing the positions, the thermosetting adhesive may be cured by blowing the hot air etc.

Although a projector using three optical modulators are presented as an example in the above embodiments, a projector using two optical modulators or more than three optical modulators may be applicable in this invention.

Although a transmissive optical modulator having different light-incident face and light-irradiation face is used in the above embodiments, a reflective optical modulator having common light-incident face and light-irradiation face may be used.

Though a front-type projector that projects an image in a direction for observing a screen is taken as an example in the above embodiments, the present invention may be applied to a rear-type projector that projects an image in a direction opposite to the direction for observing the screen.

What is claimed is:

1. An optical device comprising:
   a plurality of optical modulators for respectively modulating a plurality of color lights according to image information;
   a color-combining optical device for combining and irradiating the respective color lights modulated by the optical modulators;
   a base made of heat-conductive material and fixed to at least either one of a pair of faces crossing with a light-incident face of the color-combining optical device;
   an optical conversion plate arranged on the downstream of the each optical modulator, the optical conversion plate having: an optical conversion film for converting an optical property of a light beam irradiated from the optical modulator; and a transparent member made of heat-conductive material on which the optical conversion film is attached; and
   a retaining plate made of heat-conductive material for supporting and fixing the optical conversion plate, the retaining plate having an opening for allowing the light beam to pass therethrough,
   wherein the retaining plate is fixed to a lateral face of the base,
   wherein at least two said optical conversion plates are provided as a first optical conversion plate and a second optical conversion plate,
   wherein the retaining plate includes: a plate member supporting and fixing the first optical conversion plate at the periphery of the opening; and a protrusion protruding from the plate member toward an out-of-plane direction and supporting and fixing the second optical conversion plate,
   wherein the plate member has a bonding portion attached to the lateral face of the base and a support portion supporting and fixing the first optical conversion plate, and
   wherein the support portion is recessed relative to the bonding portion toward a protruding direction of the protrusion.

2. The optical device according to claim 1,
   wherein the each optical modulator includes an optical modulator main body for modulating the color light in accordance with image information and a holder frame holding the optical modulator main body and having at least two holes,
   wherein spacers made of heat-insulating material for fixing the optical modulator to the light-incident face of the color-combing optical device are inserted into the holes, and
   wherein the retaining plate has spacer insertion portions into which the spacers can be inserted.

3. A projector comprising: a light source; the optical device according to claim 2; and a projection optical device for projecting an optical image irradiated from the optical device in an enlarged manner.

4. The optical device according to claim 1,
   wherein the retaining plate is formed by sheet metal processing, and
   wherein the protrusion is formed by cutting and folding a part of the plate member.

5. The optical device according to claim 1,
   wherein a first support face protruding toward the inner side of the opening and supporting and fixing a light-incident face of the optical conversion plate and a second support face protruding toward the inner side of the opening and supporting and fixing a light-irradiation face of the optical conversion plate are formed at the periphery of the opening of the retaining plate, and
   wherein the first support face and the second support face are so positioned to have no planar interference with each other.

6. The optical device according to claim 5, wherein a first optical conversion film and a second optical conversion film are respectively attached to a light-incident face and a light-irradiation face of the transparent member of the optical conversion plate.

7. A projector comprising: a light source; the optical device according to claim 5; and a projection optical device for projecting an optical image irradiated from the optical device in an enlarged manner.

8. The optical device according to claim 1, wherein the base fixed to either one of the pair of faces crossing with the light-incident face of the color-combining optical device has a hole for allowing cooling air to flow between the color-combining optical device and the retaining plate.

9. The optical device according to claim 8, wherein another base fixed to the other face of the pair of faces crossing with the light-incident face of the color-combining optical device includes: a cutout for discharging the cooling air flowing between the color-combining optical device and the retaining plate to the outside; and a regulating portion extending from an edge thereof toward the opposing base to guide the cooling air flowing between the color-combining optical device and the retaining plate to the cutout.

10. A projector comprising: a light source; the optical device according to claim 8; and a projection optical device for projecting an optical image irradiated from the optical device in an enlarged manner.

11. A projector comprising: a light source; the optical device according to claim 1; and a projection optical device for projecting an optical image irradiated from the optical device in an enlarged manner.

* * * * *